US008683181B2

(12) United States Patent
Okawara

(10) Patent No.: US 8,683,181 B2
(45) Date of Patent: Mar. 25, 2014

(54) PROCESSOR AND METHOD FOR DISTRIBUTING LOAD AMONG PLURAL PIPELINE UNITS

(75) Inventor: Hideki Okawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 12/926,799

(22) Filed: Dec. 9, 2010

(65) Prior Publication Data

US 2011/0161629 A1 Jun. 30, 2011

(30) Foreign Application Priority Data

Dec. 25, 2009 (JP) ................................. 2009-294196

(51) Int. Cl.
*G06F 9/30* (2006.01)

(52) U.S. Cl.
USPC ........................................... 712/220; 718/105

(58) Field of Classification Search
None
See application file for complete search history.

(56) References Cited

U.S. PATENT DOCUMENTS

| 2002/0120831 | A1* | 8/2002 | Wong et al. ................. 712/219 |
| 2004/0044878 | A1* | 3/2004 | Evans et al. ................. 712/34 |
| 2007/0022272 | A1 | 1/2007 | Katayama | |

FOREIGN PATENT DOCUMENTS

| JP | 2000-339185 | 12/2000 |
| JP | 2007-26392 | 2/2007 |

OTHER PUBLICATIONS

Pacerisa J-M et al., "Reducing Wire Delay Penalty Through Value Prediction", MICRO-33, Proceedings of the 33$^{rd}$ Annual ACM/IEEE International Symposium on Microarchitecture, Monterey, CA, Dec. 10-13, 2000, pp. 317-326.
Powell M D et al., "Balancing Resources Utilization to Mitigate Power Density in Processor Pipelines" Microarchitecture, 2005, Proceedings of the 38$^{th}$ Annual ACM/IEEE International Symposium, Barcelona, Spain, Nov. 12-16, 2005 Piscataway, NJ, USA, IEEE, pp. 294-304.
Radhakrishnan S, et al., "Customization of Application Specific Heterogeneous Multi-Pipeline Processors", Design, Automation and Test in Europe, 2006, Proceedings in Munich, Germany, Mar. 6-10, 2006, Piscataway, NJ, USA, IEEE, vol. 1, pp. 1-6.
European Search Report dated Apr. 1, 2011 in corresponding European Patent Application 10195257.0.
Parcerisa J-M et al., "Reducing Wire Delay Penalty Through Value Prediction", MICRO-33, Proceedings of the 33$^{rd}$ Annual ACM/IEEE International Symposium on Microarchitecture. Monterey, CA, Dec. 10-13, 2000, pp. 317-326.
Powell M D et al., "Balancing Resource Utilization to Mitigate Power Density in Processor Pipelines" Microarchitecture, 2005, Proceedings of the 38$^{th}$ Annual ACM/IEEE International Symposium on Barcelona, Spain, Nov. 12-16, 2005 Piscataway, NJ, USA, IEEE, pp. 294-304.

* cited by examiner

*Primary Examiner* — Andrew Caldwell
*Assistant Examiner* — William B Partridge
(74) *Attorney, Agent, or Firm* — Staas & Halsey LLP

(57) ABSTRACT

An arithmetic processor includes a first pipeline unit configured to execute a first instruction that is input; a second pipeline unit configured to execute a second instruction that is input; a registration unit into which an aborted instruction is registered, the aborted instruction being the first instruction when the first pipeline unit is unable to complete the first instruction or the second instruction when the second pipeline unit is unable to complete the second instruction; a determination unit configured to make a determination as to which one of the first pipeline unit and the second pipeline unit is operating under a lower load; and an input unit configured to input, in the first pipeline unit or the second pipeline unit that is determined as operating under the lower load by the determination unit, the aborted instruction that is registered in the registration unit.

11 Claims, 11 Drawing Sheets

FIG.8

| EXECUTION CYCLE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| INSTRUCTION 1 | 0-1 | 0-2 | 0-3 | 0-4 | ⇒0 |  |  |  |  |  |  |  |  |  |  |  |  |  |  |  |
| INSTRUCTION 2 | 1-1 | 1-2 | 1-3 | 1-4 | ⇒1 |  |  |  |  |  |  |  |  |  |  |  |  |  |  |  |
| INSTRUCTION 3 |  | 0-1 | 0-2 | 0-3 | 0-4 | ⇒0 |  |  |  |  |  |  |  |  |  |  |  |  |  |  |
| INSTRUCTION 4 |  |  | 0-1 | 0-2 | 0-3 | 0-4 | ⇒0 |  |  |  |  |  |  |  |  |  |  |  |  |  |
| INSTRUCTION 5 |  |  |  | 0-1 | 0-2 | 0-3 | 0-4 | ⇒0 |  |  |  |  |  |  |  |  |  |  |  |  |
| INSTRUCTION 6 |  |  |  |  | 0-1 | 0-2 | 0-3 | 0-4 | ⇒0 |  |  |  |  |  |  |  |  |  |  |  |
| INSTRUCTION 7 |  |  |  |  |  | 0-1 | 0-2 | 0-3 | 0-4 | ⇒0 |  |  |  |  |  |  |  |  |  |  |
| INSTRUCTION 8 |  |  |  |  |  |  | 0-1 | 0-2 | 0-3 | 0-4 | ⇒0 |  |  |  |  |  |  |  |  |  |
| INSTRUCTION 9 |  |  |  |  |  |  |  |  |  |  |  |  |  |  | 0-1 | 0-2 | 0-3 | 0-4 | ⇒0 |  |
| INSTRUCTION 10 |  |  |  |  |  |  |  |  |  |  |  |  |  |  |  | 0-1 | 0-2 | 0-3 | 0-4 |  |

FIG.9

| EXECUTION CYCLE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| INSTRUCTION 1 | 0-1 | 0-2 | 0-3 | 0-4 | ⇒0 | | | | | | | | | | | | | | | |
| INSTRUCTION 2 | 1-1 | 1-2 | 1-3 | 1-4 | ⇒1 | | | | | | | | | | | | | | | |
| INSTRUCTION 3 | | 0-1 | 0-2 | 0-3 | 0-4 | ⇒0 | | | | | | | | | | | | | | |
| INSTRUCTION 4 | | | 0-1 | 0-2 | 0-3 | 0-4 | ⇒1 | | | | | | | | | | | | | |
| INSTRUCTION 5 | | | | 0-1 | 0-2 | 0-3 | 0-4 | ⇒1 | | | | | | | | | | | | |
| INSTRUCTION 6 | | | | | 0-1 | 0-2 | 0-3 | 0-4 | ⇒1 | | | | | | | | | | | |
| INSTRUCTION 7 | | | | | | 0-1 | 0-2 | 1-1 | 1-2 | 1-3 | 1-4 | | | | | | | | | |
| INSTRUCTION 8 | | | | | | | 0-1 | 0-2 | 0-3 | 0-4 | ⇒1 | 1-1 | 1-2 | 1-3 | 1-4 | | | | | |
| INSTRUCTION 9 | | | | | | | | | | 0-1 | 0-2 | 0-3 | 0-4 | 1-1 | 1-2 | 1-3 | 1-4 | | | |
| INSTRUCTION 10 | | | | | | | | | | | 0-1 | 0-2 | 0-3 | 0-4 | | | | | | |

PROCESSOR AND METHOD FOR DISTRIBUTING LOAD AMONG PLURAL PIPELINE UNITS

CROSS-REFERENCE TO RELATED APPLICATIONS

This patent application is based upon and claims the benefit of priority of the prior Japanese Patent Application No. 2009-294196 filed on Dec. 25, 2009, the entire contents of which are incorporated herein by reference.

FIELD

The embodiments discussed herein are related to an arithmetic processor, an information processor, and a pipeline control method of the arithmetic processor.

BACKGROUND

For example, the following technology is known. A superscalar processor is an arithmetic processor having four instruction pipelines. In the superscalar processor, a reorder buffer manages information relevant to four instructions that have been substantially simultaneously fetched from a main storage unit by an instruction fetch unit. The four instructions that have been fetched are simultaneously decoded by an instruction decode unit. Then, the four instructions are executed in parallel by four ALUs (Arithmetic Logical Units) while being arbitrated by an instruction issue control unit. For example, when a hardware failure occurs in one of the ALUs, a failure history flag is set. A reorder buffer manages information relevant to the instruction in which the failure has occurred. In accordance with this information, the instruction issue control unit uses the three ALUs without any failures to control the instruction fetch unit, the instruction decode unit, and the four ALUs, so that the failed instruction is executed once again.

Patent document 1: Japanese Laid-Open Patent Application No. 2000-339185

Patent document 2: Japanese Laid-Open Patent Application No. 2007-26392

When an instruction cannot be completed in one of the pipeline units in an arithmetic processor including plural pipeline units, the corresponding instruction is registered. The registered instruction is then entered into a pipeline unit operating under low load. In such a control method, it takes a long processing time to select one of the instructions among plural candidate instructions that have been registered.

SUMMARY

According to an aspect of the invention, an arithmetic processor includes a first pipeline unit configured to execute a first instruction that is input; a second pipeline unit configured to execute a second instruction that is input; a registration unit into which an aborted instruction is registered, the aborted instruction being the first instruction when the first pipeline unit is unable to complete the first instruction or the second instruction when the second pipeline unit is unable to complete the second instruction; a determination unit configured to make a determination as to which one of the first pipeline unit and the second pipeline unit is operating under a lower load; and an input unit configured to input, in the first pipeline unit or the second pipeline unit that is determined as operating under the lower load by the determination unit, the aborted instruction that is registered in the registration unit.

According to an aspect of the invention, an information processor includes a storage unit configured to store instructions including a first instruction and a second instruction; and an arithmetic processor connected to the storage unit, wherein the arithmetic processor includes a first pipeline unit configured to execute the first instruction that is input; a second pipeline unit configured to execute the second instruction that is input; a registration unit into which an aborted instruction is registered, the aborted instruction being the first instruction when the first pipeline unit is unable to complete the first instruction or the second instruction when the second pipeline unit is unable to complete the second instruction; a determination unit configured to make a determination as to which one of the first pipeline unit and the second pipeline unit is operating under a lower load; and an input unit configured to input, in the first pipeline unit or the second pipeline unit that is determined as operating under the lower load by the determination unit, the aborted instruction that is registered in the registration unit.

According to an aspect of the invention, a pipeline control method of an arithmetic processor includes executing a first instruction that is input, the first instruction being executed by a first pipeline unit; executing a second instruction that is input, the second instruction being executed by a second pipeline unit; registering an aborted instruction, the aborted instruction being the first instruction when the first pipeline unit is unable to complete the first instruction or the second instruction when the second pipeline unit is unable to complete the second instruction; determining which one of the first pipeline unit and the second pipeline unit is operating under a lower load; and inputting, in the first pipeline unit or the second pipeline unit that is determined as operating under the lower load at the determining, the aborted instruction that is registered.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 8 illustrates an example of an operation performed by a processor;

FIG. 9 illustrates an example of an operation performed by the processor according to the first and second embodiments of the present invention;

DESCRIPTION OF EMBODIMENTS

Figure 1:
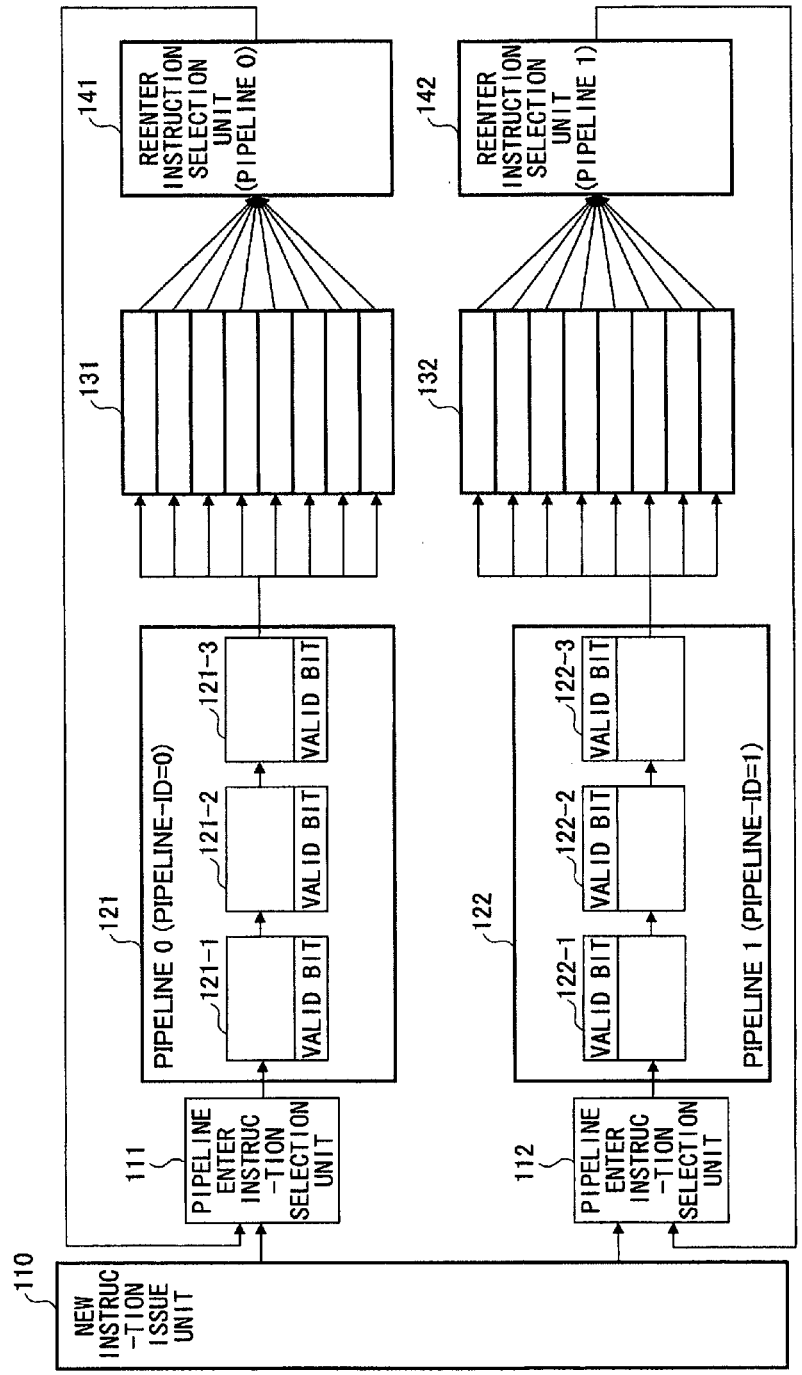
FIG. 1 is a block diagram of an example of a processor.

First, a description is given of an example of a microprocessor acting as an arithmetic processor including pipeline units with plural stages. The microprocessor includes an instruction fetch unit and an instruction issue unit for issuing an instruction relevant to a new processing request (hereinafter, an "instruction relevant to a processing request" is simply referred to as an "instruction"). Furthermore, the microprocessor includes a resource management unit for managing various circuit resource states of the pipeline units. Furthermore, the microprocessor includes a reenter wait port unit for holding an instruction that has been entered into the pipeline unit but has been aborted as the process cannot be completed due to various resource states. Hereinafter, to abort an instruction means that execution of the instruction is stopped (interrupted). Furthermore, the microprocessor includes a pipeline enter instruction selection unit that selects a new instruction from the instruction issue unit or an instruction from among plural instructions in the reenter wait port unit that may be reentered as the abort factor has been solved. The pipeline enter instruction selection unit then enters the selected instruction into the pipeline unit. Typically, it takes long processing time for the pipeline enter instruction selection unit to perform priority control on plural candidate instructions and select one of the instructions.

Meanwhile, an embodiment of the present invention has the following configuration. When an instruction that has been entered into the pipeline unit is aborted, the aborted instruction is registered into a wait port unit. A pipeline unit operating under low load is selected at the time point when the instruction is aborted. Information indicating the selected pipeline unit is stored in the wait port unit as additional information corresponding to the registered instruction. When reentering the instruction into a pipeline unit after the abort factor of the instruction is solved, the instruction is reentered into the pipeline unit indicated by the stored information. As a result, it is possible to distribute the load among plural pipeline units. Furthermore, the pipeline unit into which the instruction is to be reentered is selected in advance when the instruction has been aborted. Therefore, it is possible to reenter the instruction into a pipeline unit without taking extensive processing time, so that the load is efficiently distributed.

A processor acting as an arithmetic processor according to an embodiment of the present invention includes plural pipeline units, i.e., a first pipeline unit and a second pipeline unit having the same instruction processing function. Each pipeline unit has plural instruction execution stages for processing instructions that have been entered into corresponding stages. The processor includes a CPU (Central Processing Unit), an MPU (Micro Processing Unit), a GPU (Graphics Processing Unit), and a DSP (Digital Signal Processor). In the processor, when a factor causing an instruction to abort arises between a time point when a new instruction is received from outside the pipeline unit and a time point when a response is completed, the aborted instruction is repeatedly reentered into the pipeline unit. Hereinafter, to enter an instruction means to input the instruction in a pipeline unit, and to reenter an instruction means to input the instruction in a pipeline unit once again. The following describes an example where the load is continuously concentrated in a particular pipeline unit, an instruction is entered into a pipeline unit, the instruction is aborted due to an abort factor, and the instruction is reentered when the abort factor has been solved. A pipeline unit different from the particular pipeline unit in which the load is continuously concentrated, is determined in advance as the pipeline unit for reentering the instruction. Here, determining the pipeline unit in advance means that this determination is not made when reentering the instruction into a pipeline; the pipeline unit to be used for reentering the instruction is determined during an execution cycle (hereinafter, also referred to as an execution stage) of the instruction that has been aborted due to the abort factor. Consequently, it is possible to distribute the load among plural pipeline units without any performance overhead. "No performance overhead" means that in the pipeline load distribution method according to an embodiment of the present invention, when performing a process including selecting an instruction to be entered into a pipeline unit and entering the selected instruction into a pipeline unit, the overall processing time is the same as that of a conventional method in which the load is not distributed among plural pipeline units.

The processor acting as the arithmetic processor includes plural pipeline units, and simultaneously executes plural instructions. Alternatively, the pipeline units in the processor may perform an out-of-order process to sequentially process the instructions that are ready for execution, so that the performance is improved. The out-of-order process means to execute plural instructions that are not dependent on each other regardless of the order in which they are arranged in a program. In a first example configuration, it is assumed that the process, which is performed between a time point when an instruction is entered from outside the pipeline unit and a time point when a response is completed, is completed within fixed latency. Alternatively, in the first example configuration, the processor may include pipeline units that perform different processes. In this first example configuration, there is no need to consider distributing the load among plural pipeline units, and plural instructions may be simultaneously entered into plural pipeline units that are capable of executing the instructions. Meanwhile, in a second example configuration, the processor may include plural pipeline units that perform the same process. Furthermore, in the second example configuration, the latency, which is between a time point when an instruction is entered from outside a pipeline unit and a time point when a response is completed, may be varied depending on the dynamic statuses of the different pipeline units. Thus, in the second example configuration, the load may become uneven among the plural pipeline units, depending on the selection of pipeline units used for entering instructions.

There are cases where the process, which is performed between a time point when an instruction is entered from outside the pipeline unit and a time point when a response is completed, is not completed within fixed latency. One example is a memory access process that is performed by a processor including a main memory acting as a main storage and a cache hierarchy having plural cache memories. In this case, when a memory access instruction is entered into a pipeline unit from an instruction issue unit of the processor, there may be plural factors causing the instruction to abort. Examples of such abort factors are a cache hit/miss status, a TLB (Translation Look-aside Buffer) hit/miss status, and a status relevant to a preceding memory access instruction. The time taken to solve an abort factor of an instruction may also vary depending on the dynamic statuses of the different pipeline units. In such a processor, when the abort factor is solved for an instruction, the corresponding instruction is reentered into the pipeline unit. When all of the abort factors have been solved and the instruction is executed, the pipeline unit returns a response relevant to the instruction.

FIG. 1 illustrates a configuration of a processor that reenters an instruction into a pipeline unit after the instruction is aborted due to an abort factor. In the processor, a new instruction is entered into one of pipeline units 121 and 122 via corresponding pipeline enter instruction selection units 111 and 112 from a new instruction issue unit 110 that receives a new instruction issue from outside the pipeline units. As a result, when there is no abort factor for the instruction, the corresponding pipeline unit executes the instruction. When execution of the instruction is completed, the corresponding pipeline unit outputs a process completion response. Meanwhile, when there is an abort factor for the instruction in the pipeline unit 121 or 122, the corresponding pipeline unit 121 or 122 registers, in a corresponding wait port unit 131 or 132, the instruction that has been aborted due to the abort factor. The operation of registering an aborted instruction means storing a series of information items relevant to an instruction aborted due to an abort factor. The aborted instruction is to be reentered when the abort factor is solved. The operation of registering an aborted instruction also means not reentering the aborted instruction into a pipeline unit so that the instruction is interrupted until the abort factor is solved. Subsequently, when there is an instruction whose abort factor has been solved among the instructions that have been registered into the wait port unit 131 or 132, a corresponding reenter instruction selection unit 141 or 142 selects such an instruction, and reenters the selected instruction into the pipeline unit 121 or 122 via the pipeline enter instruction selection unit 111 or 112.

In the example of the processor illustrated in FIG. 1, for the purpose of simplifying the control method, the pipeline units 121 and 122 are provided with corresponding separate wait port units 131 and 132 and reenter instruction selection units 141 and 142, respectively. Consequently, when new instructions from outside the pipeline units are concentrated in a particular pipeline unit, the instructions to be reentered are also concentrated in the particular pipeline unit. Accordingly, the load cannot be dynamically distributed among the plural pipeline units.

Figure 2:
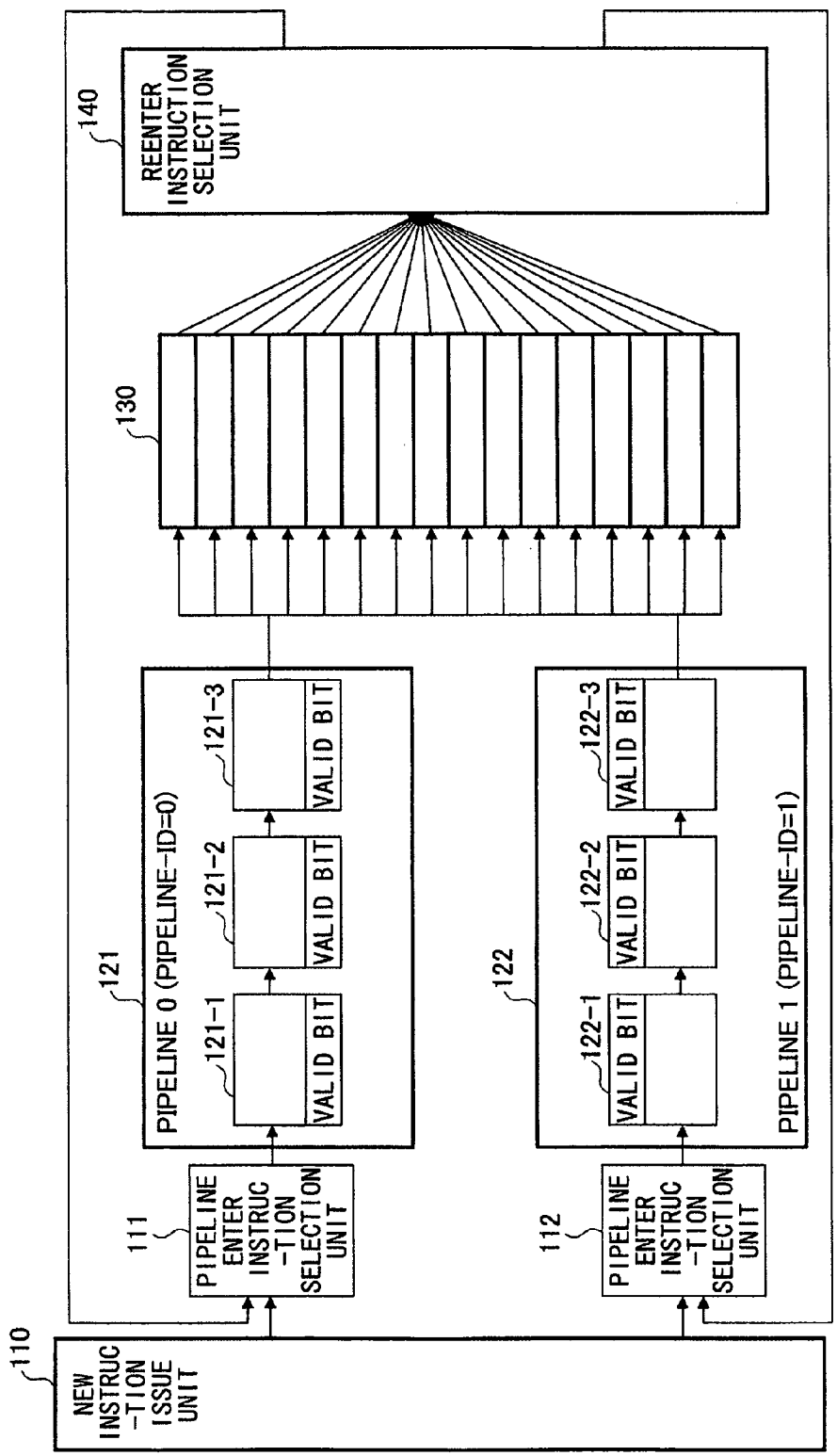
FIG. 2 is a block diagram of another example of a processor.

FIG. 2 illustrates a configuration of a processor that dynamically distributes the load among plural pipeline units. The configuration illustrated in FIG. 2 is different from that of FIG. 1 in that the two pipeline units 121 and 122 share a common wait port unit 130 and a common reenter instruction selection unit 140. Accordingly, resources of the wait port unit 130 may be efficiently used. In this example, the load is distributed by a control method performed by the reenter instruction selection unit 140. Specifically, in accordance with the load applied to the pipeline units 121 and 122, the reenter instruction selection unit 140 prioritizes the pipeline unit operating under lower load. The reenter instruction selection unit 140 reenters the instruction into the prioritized pipeline unit. Accordingly, the load is distributed between the pipeline units 121 and 122. However, in the case of FIG. 2, the processing load of the reenter instruction selection unit 140 is high, which means that the performance overhead may be high. Specifically, when the reenter instruction selection unit 140 selects an instruction from multiple entries of the wait port unit 130, the reenter instruction selection unit 140 selects the instruction to be reentered as well as the pipeline into which the instruction is to be reentered. These selections are made in consideration of distributing the load among the pipeline units 121 and 122. Consequently, the processing load of the reenter instruction selection unit 140 becomes high.

There are known methods of distributing the load in devices other than a processor. For example, in network devices, the load is distributed by analyzing the contents of packet headers and estimating the processing time. However, in the case of a processor, the instructions do not include information that may be analyzed by pipeline units of the processor. Therefore, in the case of a processor, the load is preferably distributed among plural pipeline units based on the dynamic behaviors of pipeline units.

Theoretically, the load is equally distributed among plural pipeline units in an optimum manner by dynamically distributing the load at the time point when the instructions are entered into the pipeline units 121 and 122. Specifically, in a first method, the load is distributed by the new instruction issue unit 110 that receives new instructions from outside the pipeline units and enters the new instructions into the pipeline units 121 and 122. In a second method, the load is distributed by the reenter instruction selection unit 141, 142, or 140 that receives an instruction that has been aborted due to an abort factor in the pipeline unit 121 or 122 and reenters the aborted instruction into the pipeline unit 121 or 122. However, with the first method, the new instruction issue unit 110 dynamically switches the pipeline unit into which the instruction is to be entered, and therefore the performance overhead may increase due to the operations of issuing instructions performed by the new instruction issue unit 110. Furthermore, as the new instruction issue unit 110 observes the usage statuses of the pipeline units 121 and 122 from outside the pipeline units 121 and 122 and performs the control method based on the observations, the load is distributed in a rough manner. Thus, it may not be possible to control the load in a real-time, fine-graded manner. Furthermore, in the second method described above, the reenter instruction selection unit 141, 142, or 140 selects plural instructions that are ready to be reentered, from among the plural entries of the wait port unit 131, 132, or 130, and then dynamically determines the pipeline units into which the selected instructions are to be reentered. Thus, the performance overhead may increase in the operations of reentering the instructions. As described above, it is theoretically possible to distribute the load among pipeline units in accordance with the dynamic usage statuses of the pipeline units, when issuing new instructions or when reentering instructions into the pipeline units. However, in reality, there may be problems relevant to the performance, complexities in the control method, and implementation of the hardware. In particular, the new instruction issue unit 110 and the reenter instruction selection unit 141, 142, or 140 need to be high performance. Accordingly, it may be difficult to increase the speed of operations performed by the new instruction issue unit 110 and the reenter instruction selection unit 141, 142, or 140, even in a relatively simple control method in which the load does not need to be distributed among the pipeline units 121 and 122. Therefore, there may be no margin for performance overhead in the operation of distributing the load between the pipeline units 121 and 122.

According to an embodiment of the present invention, the load is distributed among plural pipeline units as follows. Specifically, when an instruction is aborted due to an abort factor while being executed by a pipeline unit, the pipeline unit into which the instruction is to be reentered is determined. That is, in an embodiment of the present invention, when the instruction is aborted and the load is detected as being uneven among the plural pipeline units based on the latest usage statuses of the pipeline units, the pipeline unit having the lower load is determined to be used for reentering the instruction. As described below, the information, which indicates the pipeline unit to be used for reentering the instruction, is held by the wait port unit for each instruction.

According to an embodiment of the present invention, in the process of determining the pipeline unit into which an instruction is to be reentered, reference is made to the latest new instruction or the usage rate of the pipeline units when the instruction is aborted. For example, it is possible to determine the load statuses of the pipeline units based on the latest statuses of the pipeline stages included in the pipeline units (more specifically, detecting whether the load is uneven among the pipeline units). Thus, the pipeline unit may use control information relevant to the instruction that is being executed. In this case, there is substantially no need to add any hardware resources. Alternatively, it is possible to determine the usage statuses of the pipeline units based on past history relevant to the pipeline stages included in the pipeline units. In this case, a history table is prepared for recording the usage statuses of pipeline units. Accordingly, it is possible to distribute the load in a more comprehensive manner.

Figure 3:
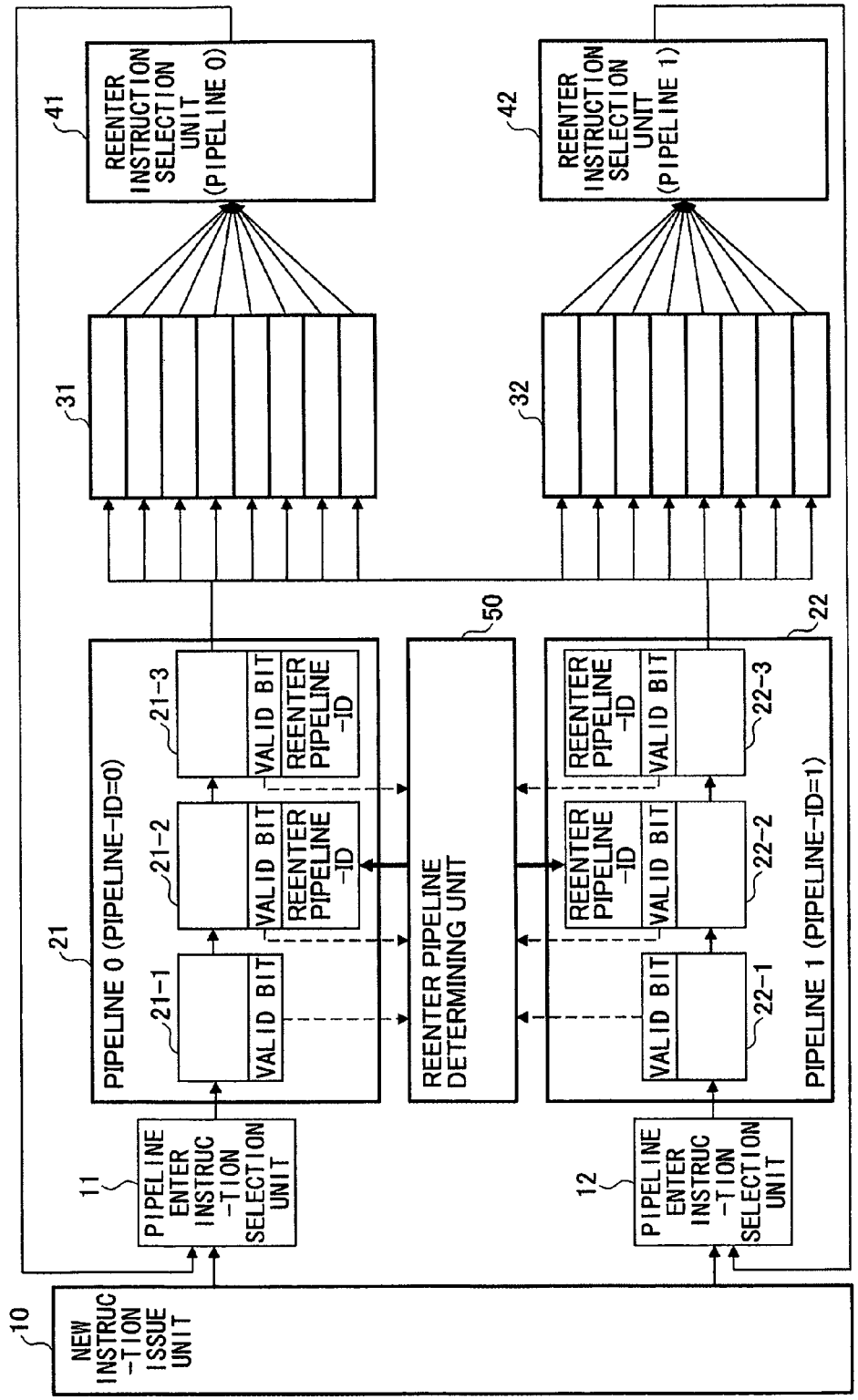
FIG. 3 is a block diagram of a processor according to a first embodiment of the present invention.

FIG. 3 illustrates a configuration of a processor acting as an arithmetic processor according to a first embodiment of the present invention. The processor illustrated in FIG. 3 includes pipeline units 21 and 22 acting as first and second pipeline units, respectively, that execute data processing in response to given instructions; and a new instruction issue unit 10 that enters, into the pipeline units 21 and 22, a new instruction is received from outside the pipeline units 21 and 22. For example, the new instruction issue unit 10 determines the pipeline unit to be used for entering an instruction in accordance with the request source of the new instruction, or in accordance with the number of new instructions that are issued simultaneously. The processor further includes pipeline enter instruction selection units 11 and 12. The pipeline enter instruction selection unit 11 selects either one of an instruction that is input from the new instruction issue unit 10 or an instruction that is input from a reenter instruction selection unit 41. Then, the pipeline enter instruction selection unit 11 enters the selected instruction into the pipeline unit 21. Similarly, the pipeline enter instruction selection unit 12 selects either one of an instruction that is input from the new instruction issue unit 10 or an instruction that is input from a reenter instruction selection unit 42. Then, the pipeline enter instruction selection unit 12 enters the selected instruction into the pipeline unit 22. In one example, the pipeline enter instruction selection units 11 and 12 may prioritize an instruction that is reentered after an abort factor is solved, over a new instruction. The pipeline enter instruction selection units 11 and 12 may enter a new instruction into the respective pipeline units 21 and 22 only when there is no instruction that is to be reentered. However, this is merely one example; the method of selecting instructions performed by the pipeline enter instruction selection units 11 and 12 is not limited to this example.

The pipeline unit 21 includes a pipeline stage 21-1 (first stage) acting as a first processing unit, a pipeline stage 21-2 (second stage) acting as a second processing unit, and a pipeline stage 21-3 (third stage). An instruction that is entered into the pipeline unit 21 from the new instruction issue unit 10 is executed by the pipeline stage 21-1 in a first execution cycle. Then, this instruction is executed by the pipeline stage 21-2 in a second execution cycle. Then, this instruction is executed by the pipeline stage 21-3 in a third execution cycle. Then, in an execution cycle subsequent to the third execution cycle, the execution result of the instruction is output from the pipeline stage 21-3. Contents of the processes executed by the pipeline stages 21-1, 21-2, and 21-3 are described below with reference to FIG. 10.

Similarly, the pipeline unit 22 includes a pipeline stage 22-1 (first stage) acting as a third processing unit, a pipeline stage 22-2 (second stage) acting as a fourth processing unit, and a pipeline stage 22-3 (third stage). An instruction that is entered into the pipeline unit 22 from the new instruction issue unit 10 is executed by the pipeline stage 22-1 in a first execution cycle. Then, this instruction is executed by the pipeline stage 22-2 in a second execution cycle. Then, this instruction is executed by the pipeline stage 22-3 in a third execution cycle. Then, in an execution cycle subsequent to the third execution cycle, the execution result of the instruction is output from the pipeline stage 22-3. The pipeline stages 22-1, 22-2, and 22-3 have the same configurations as the pipeline stages 21-1, 21-2, and 21-3, respectively. Therefore, similar execution results are obtained regardless of whether an instruction is entered in the pipeline unit 21 or the pipeline unit 22.

The pipeline stages 21-1, 21-2, and 21-3 and the pipeline stages 22-1, 22-2, and 22-3 have valid bits, as illustrated in FIG. 3. A valid bit is information indicating whether the corresponding pipeline stage is presently used. If the pipeline stage is presently used, the valid bit indicates a value "1", and if the pipeline stage is not presently used, the valid bit indicates a value "0". Furthermore, the pipeline stage 21-2 (second stage), the pipeline stage 21-3 (third stage), the pipeline stage 22-2 (second stage), and the pipeline stage 22-3 (third stage) have reenter pipeline-IDs. A reenter pipeline-ID is information indicating the pipeline unit to be used for reentering an instruction when an abort factor of the instruction is solved, in a case where an abort factor has occurred as a result of executing the instruction by the final pipeline stage 21-3 or 22-3. If the pipeline unit to be used for reentering an instruction is the pipeline unit 21, the reenter pipeline-ID indicates a value "0". If the pipeline unit to be used for reentering an instruction is the pipeline unit 22, the reenter pipeline-ID indicates a value "1".

Furthermore, the processor according to the first embodiment of the present invention includes a reenter pipeline determining unit 50 that determines the reenter pipeline-ID of the pipeline unit to be used for reentering an instruction that has been aborted while being executed by the pipeline stage 21-1 (first stage) or the pipeline stage 22-1 (first stage). The reenter pipeline determining unit 50 sets the information, which indicates the pipeline unit determined to be used for reentering the instruction, as the reenter pipeline-ID, in the pipeline stage 21-2 (second stage) and the pipeline stage 22-2 (second stage). The reenter pipeline-ID set in the pipeline stage 21-2 is conveyed to the next pipeline stage 21-3 together with the instruction being executed by the pipeline stage 21-2, in synchronization with the execution cycle of the pipeline unit 21. Similarly, the reenter pipeline-ID set in the pipeline stage 22-2 is conveyed to the next pipeline stage 22-3 together with the instruction being executed by the pipeline stage 22-2, in synchronization with the execution cycle of the pipeline unit 22.

Furthermore, the processor according to the first embodiment includes wait port units 31 and 32 acting as registration units for holding the aborted instructions. An instruction is registered in either one of the wait port units 31 or 32, depending on the pipeline unit that is determined by the reenter pipeline determining unit 50 as the pipeline unit used for reentering an aborted instruction. When the reenter pipeline determining unit 50 has determined that the pipeline unit 21 is to be used for reentering an instruction, the instruction that is output from the pipeline unit 21 or the pipeline unit 22 is registered in the wait port unit 31. Meanwhile, when the reenter pipeline determining unit 50 has determined that the pipeline unit 22 is to be used for reentering an instruction, the instruction that is output from the pipeline unit 21 or the pipeline unit 22 is registered in the wait port unit 32. Specifically, assuming that the pipeline unit 21 is indicated by the reenter pipeline-ID, which has been set in the pipeline stage 21-2 by the reenter pipeline determining unit 50 and conveyed to the pipeline stage 21-3 together with the instruction in the next cycle, the following operation is performed. That is, if the instruction is aborted in the pipeline stage 21-3, the instruction is registered in the wait port unit 31. Meanwhile, assuming that the pipeline unit 22 is indicated by the reenter pipeline-ID, which has been set in the pipeline stage 21-2 by the reenter pipeline determining unit 50 and conveyed to the pipeline stage 21-3 together with the instruction in the next cycle, the following operation is performed. That is, if the instruction is aborted in the pipeline stage 21-3, the instruction is registered in the wait port unit 32. Similarly, assuming that the pipeline unit 21 is indicated by the reenter pipeline-ID, which has been set in the pipeline stage 22-2 by the reenter pipeline determining unit 50 and conveyed to the pipeline stage 22-3 together with the instruction in the next cycle, the following operation is performed. That is, if the instruction is aborted in the pipeline stage 22-3, the instruction is registered in the wait port unit 31. Meanwhile, assuming that the pipeline unit 22 is indicated by the reenter pipeline-ID, which has been set in the pipeline stage 22-2 by the reenter pipeline determining unit 50 and conveyed to the pipeline stage 22-3 together with the instruction in the next cycle, the following operation is performed. That is, if the instruction is aborted in the pipeline stage 22-3, the instruction is registered in the wait port unit 32.

Furthermore, the processor according to the first embodiment of the present invention includes the reenter instruction selection unit 41 acting as an input unit. When the reenter instruction selection unit 41 receives a signal indicating that the abort factor relevant to the instruction registered in the wait port unit 31 has been solved, the reenter instruction selection unit 41 reenters the instruction into the pipeline unit 21 via the pipeline enter instruction selection unit 11. Furthermore, the processor according to the first embodiment of the present invention includes the reenter instruction selection unit 42 acting as an input unit. When the reenter instruction selection unit 42 receives a signal indicating that the abort factor relevant to the instruction registered in the wait port unit 32 has been solved, the reenter instruction selection unit 42 reenters the instruction into the pipeline unit 22 via the pipeline enter instruction selection unit 12.

In the configuration illustrated in FIG. 1, a wait port unit and a reenter instruction selection unit is provided for each pipeline unit into which a new instruction is entered from outside the pipeline unit. Thus, it is not possible to distribute the load between the pipeline units. Meanwhile, in the processor according to the first embodiment of the present invention illustrated in FIG. 3, the reenter pipeline determining unit 50 obtains information relevant to the valid bits of the pipeline stages of the pipeline units 21 and 22 to obtain the usage statuses of the pipeline units 21 and 22. In this manner, the reenter pipeline determining unit 50 detects unevenness in the load among the pipeline units 21 and 22. When the load is continuously concentrated a particular pipeline unit, the reenter pipeline determining unit 50 selects another pipeline unit as the pipeline unit used for reentering an instruction. For example, when the reenter pipeline determining unit 50 detects that the load is concentrated in the pipeline unit 21, the reenter pipeline determining unit 50 determines that the pipeline unit 22 is to be the pipeline unit used for reentering an instruction. Similarly, when the reenter pipeline determining unit 50 detects that the load is concentrated in the pipeline unit 22, the reenter pipeline determining unit 50 determines that the pipeline unit 21 is to be the pipeline unit used for reentering an instruction. Meanwhile, when the reenter pipeline determining unit 50 does not detect that the load is concentrated in any of the pipeline units, the reenter pipeline determining unit 50 determines that the pipeline unit into which the instruction is initially entered is to be the pipeline unit used for reentering an instruction. For example, when the reenter pipeline determining unit 50 detects that the load is concentrated in the pipeline unit into which the instruction is initially entered, the reenter pipeline determining unit 50 determines that another pipeline unit is to be the pipeline unit used for reentering an instruction. In this case, the pipeline unit to be used is changed for this instruction.

In the processor according to the first embodiment of the present invention, the process of selecting the pipeline unit for distributing the load between the pipeline units 21 and 22 is performed between a time point when an instruction is executed by a pipeline unit and a time point when it is detected that the instruction has been aborted. Consequently, the operation of issuing (entering) a new instruction performed by the new instruction issue unit 10 and the operation of reentering the instruction performed by the reenter instruction selection units 41 and 42 are performed in the same manner as that in a case where the load is not distributed between the pipeline units 21 and 22. Therefore, the performance overhead is small.

Figure 4:
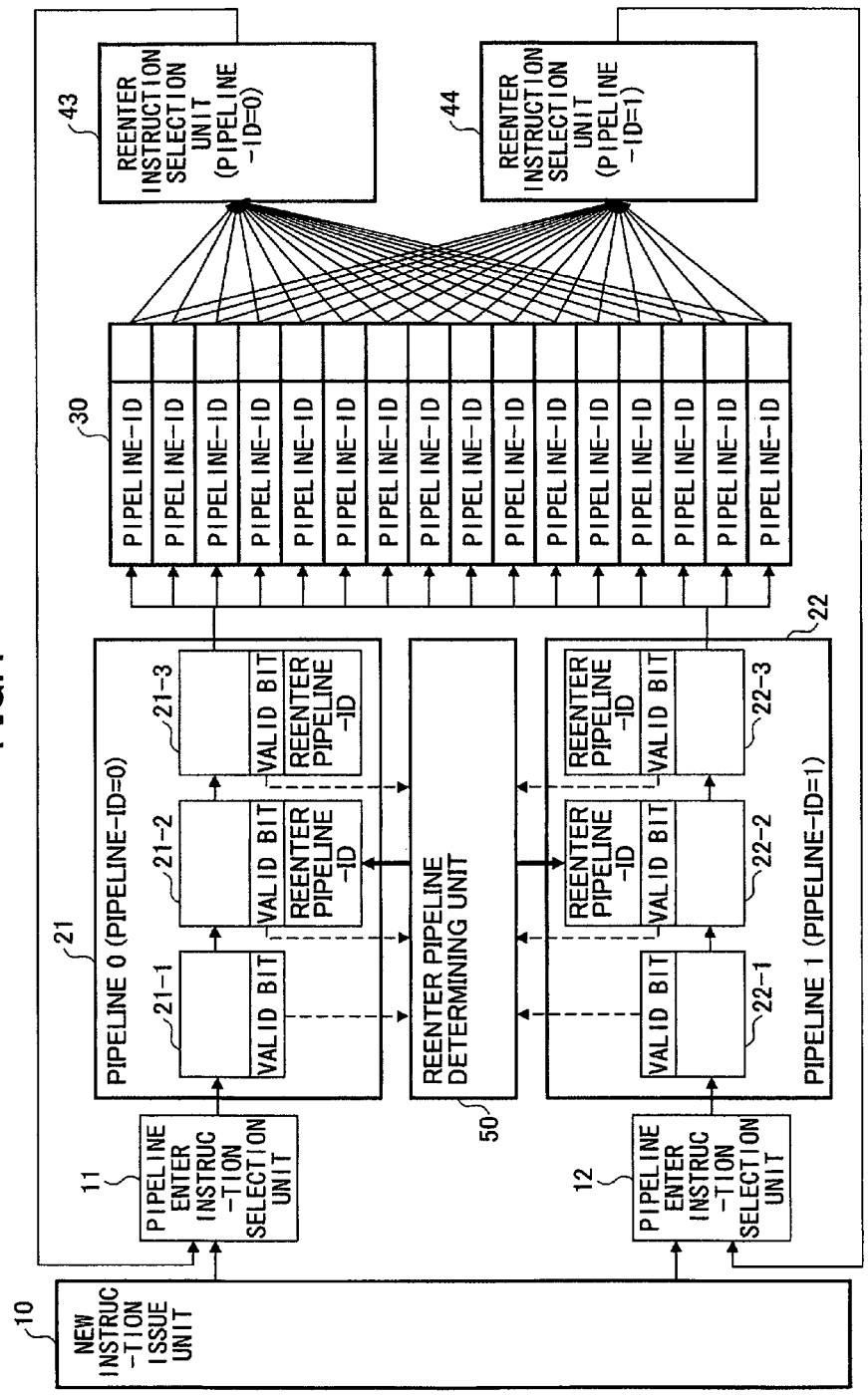
FIG. 4 is a block diagram of a processor according to a second embodiment of the present invention.

FIG. 4 illustrates a configuration of a processor according to a second embodiment of the present invention. In the processor illustrated in FIG. 4, the new instruction issue unit 10, the pipeline units 21 and 22, and the reenter pipeline determining unit 50 respectively have the same configurations as those of the new instruction issue unit 10, the pipeline units 21 and 22, and the reenter pipeline determining unit 50 in the processor according to the first embodiment described above.

The processor according to the second embodiment includes a wait port unit 30 acting as a registration unit common to all of the pipelines, for registering instructions that have been aborted in the pipeline units 21 and 22. In the processor according to the second embodiment, the information (reenter pipeline-ID) relevant to the pipeline unit used for reentering the instruction is registered, together with the aborted instruction, in the wait port unit 30 in association with the instruction. That is to say, in the processor according to the second embodiment, an instruction that is output from the pipeline unit 21 or 22 is registered in the wait port unit 30, regardless of the pipeline unit that is determined by the reenter pipeline determining unit 50 as the pipeline unit used for reentering the instruction. Specifically, the reenter pipeline determining unit 50 sets a reenter pipeline-ID in the pipeline stage 21-2 and conveys the reenter pipeline-ID to the pipeline stage 21-3 with the instruction in the next cycle. Then, if the instruction is aborted in the pipeline stage 21-3, the reenter pipeline-ID is associated with the aborted instruction and registered in the wait port unit 30. Similarly, the reenter pipeline determining unit 50 sets a reenter pipeline-ID in the pipeline stage 22-2 and conveys the reenter pipeline-ID to the pipeline stage 22-3 with the instruction in the next cycle. Then, if the instruction is aborted in the pipeline stage 22-3, the reenter pipeline-ID is associated with the aborted instruction and registered in the wait port unit 30.

Furthermore, the processor according to the second embodiment includes reenter instruction selection units 43 and 44 acting as input units. Specifically, when a signal indicating that the abort factor relevant to the instruction registered in the wait port unit 30 has been solved is received from outside, the reenter instruction selection units 43 and 44 reenter the instruction into the pipeline units 21 and 22 via the pipeline enter instruction selection units 11 and 12, respectively. Specifically, the reenter instruction selection unit 43 performs the following operation. The reenter instruction selection unit 43 selects an instruction having a reenter pipeline-ID indicating the pipeline unit 21, from among the instructions whose abort factors have been solved and registered in the wait port unit 30. The reenter instruction selection unit 43 then reenters the selected instruction into the pipeline unit 21 via the pipeline enter instruction selection unit 11. Similarly, the reenter instruction selection unit 44 performs the following operation. The reenter instruction selection unit 44 selects an instruction having a reenter pipeline-ID indicating the pipeline unit 22 from among the instructions whose abort factors have been solved and registered in the wait port unit 30. The reenter instruction selection unit 44 then reenters the selected instruction into the pipeline unit 22 via the pipeline enter instruction selection unit 12.

Similar to the processor illustrated in FIG. 2, the processor according to the second embodiment includes the wait port unit 30 that is common to the plural pipeline units 21 and 22, which is different from the configuration of the processor according to the first embodiment of the present invention. Similar to the processor according to the first embodiment, the processor according to the second embodiment includes the reenter pipeline determining unit 50 that detects whether the load is uneven between the pipeline units 21 and 22. When the load is continuously concentrated in a particular pipeline unit, the reenter pipeline determining unit 50 performs the following operation. When registering the instruction in the wait port unit 30, the reenter pipeline determining unit 50 determines that a pipeline unit other than the particular pipeline unit is to be the pipeline unit indicated by the reenter pipeline-ID registered in the wait port unit 30. For example, when the reenter pipeline determining unit 50 detects that the load is concentrated in the pipeline unit into which the instruction is initially entered, the reenter pipeline determining unit 50 determines that a pipeline unit other than the initial pipeline unit is to be the pipeline unit used for reentering the instruction. In this case, the pipeline unit to be used is changed for this instruction.

In the processor according to the first embodiment, the pipeline units 21 and 22 are provided with corresponding separate wait port units 31 and 32, respectively. The wait port unit to be used for registering an aborted instruction is switched between the wait port units 31 and 32, so that the load is distributed between the pipeline units 21 and 22. Meanwhile, in the processor according to the second embodiment, the wait port unit 30 is common to both of the pipeline units 21 and 22. Therefore, in the processor according to the second embodiment, when registering an aborted instruction, the pipeline unit 21 or 22 associates the aborted instruction with a reenter pipeline-ID, and registers the aborted instruction together with the reenter pipeline-ID into the wait port unit 30. Among the instructions in the wait port unit 30 whose abort factors have been solved, the reenter instruction selection unit 43 selects an instruction having a reenter pipeline-ID indicating the pipeline unit 21, and reenters the selected instruction into the pipeline unit 21 via the pipeline enter instruction selection unit 11. Similarly, among the instructions in the wait port unit 30 whose abort factors have been solved, the reenter instruction selection unit 44 selects an instruction having a reenter pipeline-ID indicating the pipeline unit 22, and reenters the selected instruction into the pipeline unit 22 via the pipeline enter instruction selection unit 12.

As described above, in the processor according to the second embodiment, the load is distributed between the pipeline units 21 and 22. Furthermore, similar to the processor according to the first embodiment, in the processor according to the second embodiment, the process of selecting the pipeline unit for distributing the load between the pipeline units 21 and 22 is performed between a time point when an instruction is executed by a pipeline unit and a time point when it is detected that the instruction has been aborted. Consequently, the operation of issuing (entering) a new instruction performed by the new instruction issue unit 10 and the operation of reentering the instruction performed by the reenter instruction selection units 43 and 44 are performed in the same manner as that in a case where the load is not distributed between the pipeline units 21 and 22. Therefore, the performance overhead is small. The reenter instruction selection unit 43 only needs to select one instruction having a reenter pipeline-ID indicating the pipeline unit 21, from among the instructions registered in the wait port unit 30 whose abort factors have been solved. The instructions may be selected in the order in which the instructions have been registered. Similarly, the reenter instruction selection unit 44 only needs to select one instruction having a reenter pipeline-ID indicating the pipeline unit 22, from among the instructions registered in the wait port unit 30 whose abort factors have been solved. The instructions may be selected in the order in which the instructions have been registered. In the case of the processor illustrated in FIG. 2, among the instructions registered in the wait port unit 130, the reenter instruction selection unit 140 selects an instruction whose abort factor has been solved in consideration of the number of pipeline units, and then selects the pipeline unit into which the selected instruction is to be reentered. Accordingly, with the processor according to the second embodiment, it is possible to reduce the performance overhead and distribute the load, compared to the case of the processor illustrated in FIG. 2.

Figure 5:
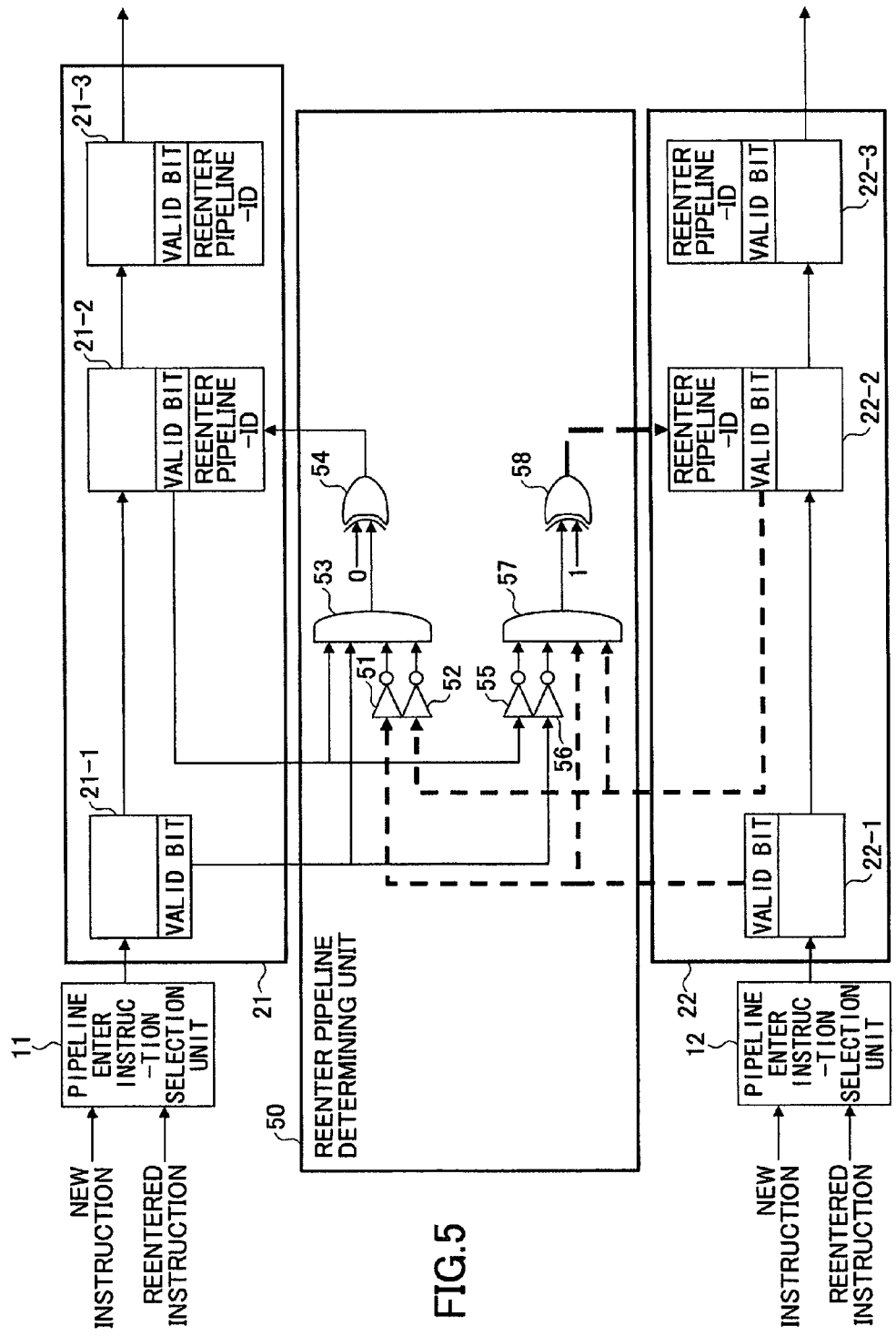
FIG. 5 illustrates a reenter pipeline determining unit illustrated in FIGS. 3 and 4.

Next, with reference to FIG. 5, a description is given of the reenter pipeline determining unit 50 of the processors according to the first and second embodiments of the present invention described with reference to FIGS. 3 and 4, respectively. As illustrated in FIG. 5, the reenter pipeline determining unit 50 includes AND (logical product) gates 53 and 57, NOT (inversion) gates 51, 52, 55, and 56, and XOR (exclusive OR) gates 54 and 58. The valid bits of the pipeline stages 21-1 and 21-2 in the first and second stages of the pipeline unit 21 are input to the AND gate 53 and the NOT gates 55 and 56. The valid bits of the pipeline stages 22-1 and 22-2 in the first and second stages of the pipeline unit 22 are input into the AND gate 57 and the NOT gates 51 and 52. Output from the NOT gates 51 and 52 is input to the AND gate 53, and output from the NOT gates 55 and 56 is input to the AND gate 57. Output from the AND gate 53 is input to the XOR gate 54, and output from the AND gate 57 is input to the XOR gate 58. Furthermore, "0" is input to the XOR gate 54 as another input, and "1" is input to the XOR gate 58 as another input.

The reenter pipeline determining unit 50 having the above configuration detects unevenness in the load between the pipeline units 21 and 22, each having a three-stage structure including pipeline stages 21-1, 21-2, and 21-3 and pipeline stages 22-1, 22-2, and 22-3, respectively. In the example illustrated in FIG. 5, the reenter pipeline determining unit 50 uses the valid bits of the pipeline stages 21-1 and 22-1 that respectively correspond to the first stages of the pipeline units 21 and 22, as well as the valid bits of the pipeline stages 21-2 and 22-2 that respectively correspond to the second stages of the pipeline units 21 and 22.

When the valid bits of the pipeline stages 21-1 and 21-2 of the pipeline unit 21 are both "1" (presently used), it means that the pipeline unit 21 is used over two continuous execution cycles. In this case, it is determined that the load of the pipeline unit 21 is high. Similarly, when the valid bits of the pipeline stages 22-1 and 22-2 of the pipeline unit 22 are both "1" (presently used), it means that the pipeline unit 22 is used over two continuous execution cycles. In this case, it is determined that the load of the pipeline unit 22 is high.

Conversely, when the valid bits of the pipeline stages 21-1 and 21-2 of the pipeline unit 21 are both "0" (not presently used), it means that the pipeline unit 21 is not used over two continuous execution cycles. In this case, it is determined that the load of the pipeline unit 21 is low. Similarly, when the valid bits of the pipeline stages 22-1 and 22-2 of the pipeline unit 22 are both "0" (not presently used), it means that the pipeline unit 22 is not used over two continuous execution cycles. In this case, it is determined that the load of the pipeline unit 22 is low. Based on the usage statuses of two pipeline stages in the pipeline units that are determined by the above method, the reenter pipeline determining unit 50 detects whether the load is uneven between the pipeline units 21 and 22, and sets the reenter pipeline-ID according to the detection result.

Specifically, the reenter pipeline determining unit 50 illustrated in FIG. 5 performs the following operations. For example, it is assumed that the pipeline stages 21-1 and 21-2 in the first and second stages of the pipeline unit 21 are presently used and the pipeline stages 22-1 and 22-2 in the first and second stages of the pipeline unit 22 are not presently used, such that the load is concentrated in the pipeline unit 21. In this case, the valid bits of the pipeline stages 21-1 and 21-2 are "1", and the valid bits of the pipeline stages 22-1 and 22-2 are "0". The valid bits "0" of the pipeline stages 22-1 and 22-2 are inverted to "1" at the NOT gates 51 and 52, respectively. Consequently, the four values input to the AND gate 53 are "1". Thus, the AND gate 53 outputs "1", the two values input to the XOR gate 54 are "0" and "1", and the XOR gate 54 outputs "1". Because "1" is output from the XOR gate 54, "1" is set as the reenter pipeline-ID of the pipeline stage 21-2. Furthermore, the valid bits "1" of the pipeline stages 21-1 and 21-2 are inverted to "0" at the NOT gates 55 and 56, respectively. Consequently, the four values input to the AND gate 57 are "0". Thus, the AND gate 57 outputs "0", the two values input to the XOR gate 58 are "0" and "1", and the XOR gate 58 outputs "1". Because "1" is output from the XOR gate 58, "1" is set as the reenter pipeline-ID of the pipeline stage 22-2. In this example, as the load is concentrated in the pipeline unit 21, the reenter pipeline determining unit 50 selects the pipeline unit 22 (reenter pipeline-ID=1) as the pipeline unit used for reentering the instruction, and sets the reenter pipeline-ID=1 for both of the pipeline stages 21-2 and 22-2.

Next, in another example, it is assumed that the pipeline stages 21-1 and 21-2 in the first and second stages of the pipeline unit 21 are not presently used and the pipeline stages 22-1 and 22-2 in the first and second stages of the pipeline unit 22 are presently used, such that the load is concentrated in the pipeline unit 22. In this case, the valid bits of the pipeline stages 21-1 and 21-2 are "0", and the valid bits of the pipeline stages 22-1 and 22-2 are "1". The valid bits "1" of the pipeline stages 22-1 and 22-2 are inverted to "0" at the NOT gates 51 and 52, respectively. Consequently, the four values input to the AND gate 53 are "0". Thus, the AND gate 53 outputs "0", the two values input to the XOR gate 54 are "0" and "0", and the XOR gate 54 outputs "0". Because "0" is output from the XOR gate 54, "0" is set as the reenter pipeline-ID of the pipeline stage 21-2. Furthermore, the valid bits "0" of the pipeline stages 21-1 and 21-2 are inverted to "1" at the NOT gates 55 and 56, respectively. Consequently, the four values input to the AND gate 57 are "1". Thus, the AND gate 57 outputs "1", the two values input to the XOR gate 58 are "1" and "1", and the XOR gate 58 outputs "0". Because "0" is output from the XOR gate 58, "0" is set as the reenter pipeline-ID of the pipeline stage 22-2. In this example, as the load is concentrated in the pipeline unit 22, the reenter pipeline determining unit 50 selects the pipeline unit 21 (reenter pipeline-ID=0) as the pipeline unit used for reentering the instruction, and sets the reenter pipeline-ID=0 for both of the pipeline stages 21-2 and 22-2.

That is to say, the reenter pipeline determining unit 50 illustrated in FIG. 5 performs the following operation in a case where the pipeline stages 21-1 and 21-2 in the first and second stages of the pipeline unit 21 are presently used and the pipeline stages 22-1 and 22-2 in the first and second stages of the pipeline unit 22 are not presently used. Specifically, for both of the pipeline units 21 and 22, the reenter pipeline determining unit 50 sets the pipeline unit 22 as the pipeline unit to be used for reentering instructions. Conversely, the reenter pipeline determining unit 50 illustrated in FIG. 5 performs the following operation in a case where the pipeline stages 21-1 and 21-2 in the first and second stages of the pipeline unit 21 are not presently used and the pipeline stages 22-1 and 22-2 in the first and second stages of the pipeline unit 22 are presently used. Specifically, for both of the pipeline units 21 and 22, the reenter pipeline determining unit 50 sets the pipeline unit 21 as the pipeline unit to be used for reentering instructions.

The above describes a case where both the pipeline stages 21-1 and 21-2 are used and neither of the pipeline stages 22-1 and 22-2 are used, and a case where neither of the pipeline stages 21-1 and 21-2 are used and both of the pipeline stages 22-1 and 22-2 are used. Next, a description is given of cases other than the two cases described above. In cases other than the two cases described above, not all of the four inputs to the AND gate 53 are "1", and not all of the four inputs to the AND gate 57 are "1". Accordingly, both of the AND gates 53 and 57 output "0". Consequently, the two inputs to the XOR gate 54 are "0", and the XOR gate 54 outputs "0". Meanwhile, the two inputs to the XOR gate 58 are "0" and "1", and the XOR gate 58 outputs "1". Accordingly, the reenter pipeline determining unit 50 sets "0" (a reenter pipeline-ID indicating the pipeline unit 21) for the pipeline stage 21-2 of the pipeline unit 21. Furthermore, the reenter pipeline determining unit 50 sets "1" (a reenter pipeline-ID indicating the pipeline unit 22) for the pipeline stage 22-2 of the pipeline unit 22. Consequently, instructions that are entered into the pipeline unit 21 are reentered into the same pipeline unit 21, and instructions that are entered into the pipeline unit 22 are reentered into the same pipeline unit 22. That is to say, the instructions are reentered into the pipeline unit into which they are initially entered. In this case, the reenter pipeline determining unit 50 determines that the load is not uneven between the pipeline units 21 and 22, and thus does not change the pipeline unit used for reentering the instructions from the pipeline unit into which the instructions are initially entered.

The processors according to the first and second embodiments of the present invention described with reference to FIGS. 3, 4, and 5 include two pipeline units 21 and 22, each having a three-stage structure including pipeline stages 21-1, 21-2, and 21-3 and pipeline stages 22-1, 22-2, and 22-3, respectively. However, the present invention is not limited to these examples; the number of pipeline units may be three or more, and the number of pipeline stages included in each pipeline unit may be four or more or two. Furthermore, the method performed by the reenter pipeline determining unit 50 for detecting whether the load is uneven between the pipeline units 21 and 22 is not limited to the above example. For example, the reenter pipeline determining unit 50 may have a circuit configuration other than that illustrated in FIG. 5, as long as the functions are the same.

Figure 6:
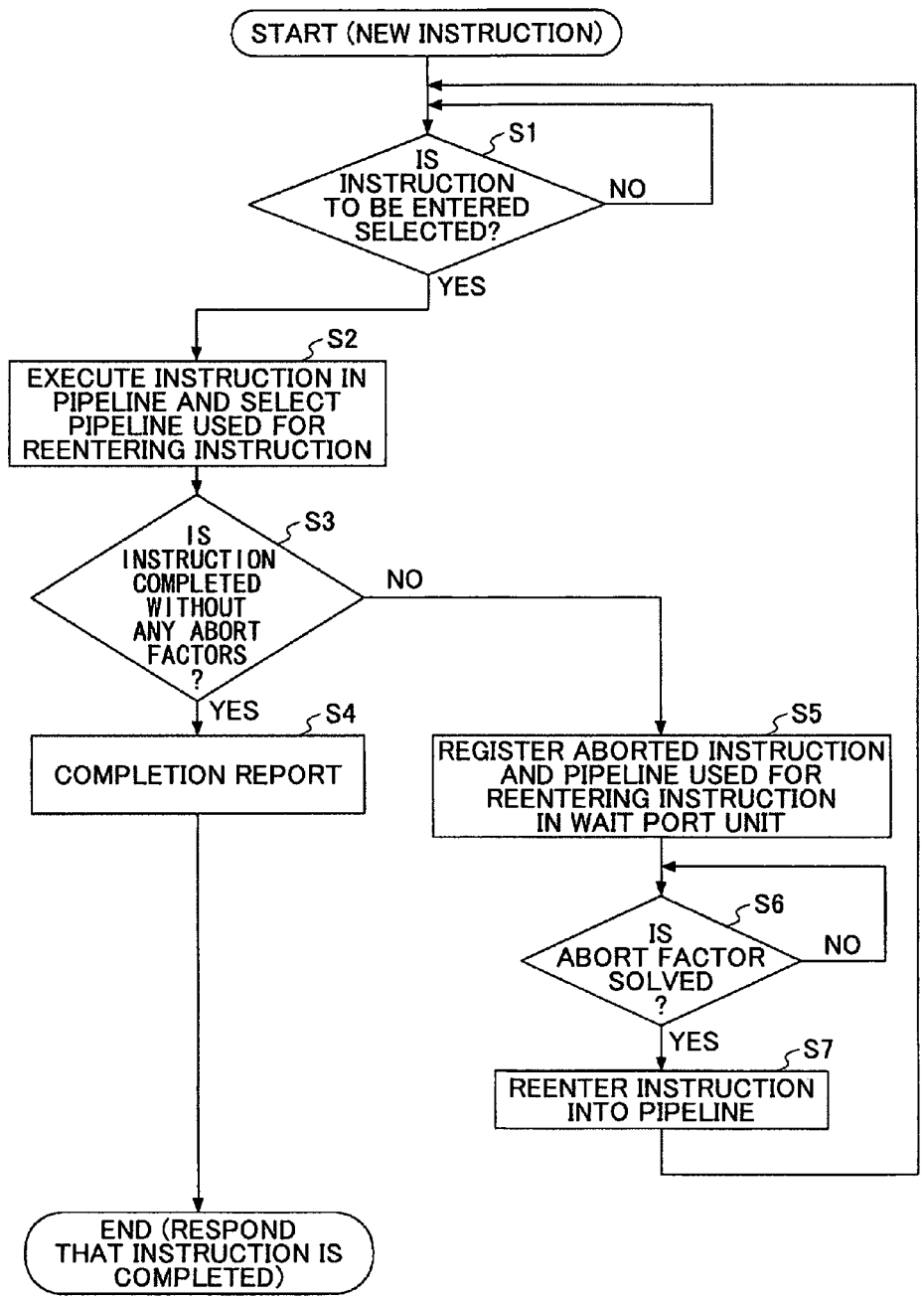
FIG. 6 is a flowchart of control operations performed by the processor according to the first and second embodiments of the present invention.

FIG. 6 is a flowchart of operations performed by the processors according to the first and second embodiments of the present invention described with reference to FIGS. 3 and 4. Referring to FIG. 6, the pipeline enter instruction selection units 11 and 12 illustrated in FIGS. 3 and 4 select a new instruction or an instruction to be reentered, and enter the selected instruction into the corresponding pipeline units 21 and 22 (YES in step S1). When a new instruction and an instruction to be reentered occur at the same time, the instruction that is not selected is included among the selection candidates for the next cycle (NO in step S1). The instructions entered into the pipeline units 21 and 22 (YES at step S1) are executed by the pipeline units 21 and 22, and at the same time, the reenter pipeline determining unit 50 determines the pipeline unit to be used for reentering the instructions depending on the load of the pipeline units 21 and 22 (step S2). When the pipeline units 21 and 22 execute the instructions, and there are no abort factors of the instructions (YES in step S3), the pipeline units 21 and 22 output signals indicating completion reports (step S4). When the pipeline units 21 and 22 execute the instructions, and the instructions are aborted due to abort factors (NO in step S3), the pipeline units 21 and 22 register the instructions in the wait port units 31, 32, or 30 corresponding to the pipeline unit to be used for reentering the instructions that have been set in step S2 (step S5).

In the processor according to the first embodiment illustrated in FIG. 3, the aborted instructions are registered as follows. When the pipeline unit 21 has been selected as the pipeline unit used for reentering the instructions in step S2, the pipeline units 21 and 22 register the instructions in the wait port unit 31. Similarly, when the pipeline unit 22 has been selected as the pipeline unit used for reentering the instructions in step S2, the pipeline units 21 and 22 register the instructions in the wait port unit 32. Meanwhile, in the processor according to the second embodiment illustrated in FIG. 4, the aborted instructions are registered as follows. When the pipeline unit 21 has been selected as the pipeline unit used for reentering the instructions in step S2, the pipeline units 21 and 22 associate the aborted instructions with information indicating the pipeline unit 21 as the pipeline unit used for reentering the instructions, and register the instructions together with the information into the wait port unit 30. Similarly, when the pipeline unit 22 has been selected as the pipeline unit used for reentering the instructions in step S2, the pipeline units 21 and 22 associate the aborted instructions with information indicating the pipeline unit 22 as the pipeline unit used for reentering the instructions, and register the instructions together with the information into the wait port unit 30.

Next, when the abort factors of the instructions registered in step S5 are solved, and signals reporting that the abort factors are solved are received (YES in step S6), the reenter instruction selection units 41 and 42 or 43 and 44 reenter the corresponding instructions into the pipeline units 21 and 22 via the pipeline enter instruction selection units 11 and 12 (step S7). In the case of the first embodiment illustrated in FIG. 3, the following operation is performed in step S7. When the instruction has been registered in the wait port unit 31, the reenter instruction selection unit 41 reenters the instruction into the pipeline unit 21 via the pipeline enter instruction selection unit 11. Meanwhile, when the instruction has been registered in the wait port unit 32, the reenter instruction selection unit 42 reenters the instruction into the pipeline unit 22 via the pipeline enter instruction selection unit 12.

In the case of the second embodiment illustrated in FIG. 4, the following operation is performed in step S7. When the information that has been associated with the instruction and registered into the wait port unit 30 together with the instruction is indicating the pipeline unit 21 as the pipeline unit used for reentering the instructions, the reenter instruction selection unit 43 reenters the instruction into the pipeline unit 21 via the pipeline enter instruction selection unit 11. Meanwhile, when the information that has been associated with the instruction and registered into the wait port unit 30 together with the instruction is indicating the pipeline unit 22 as the pipeline unit used for reentering the instructions, the reenter instruction selection unit 44 reenters the instruction into the pipeline unit 22 via the pipeline enter instruction selection unit 12.

Figure 7:
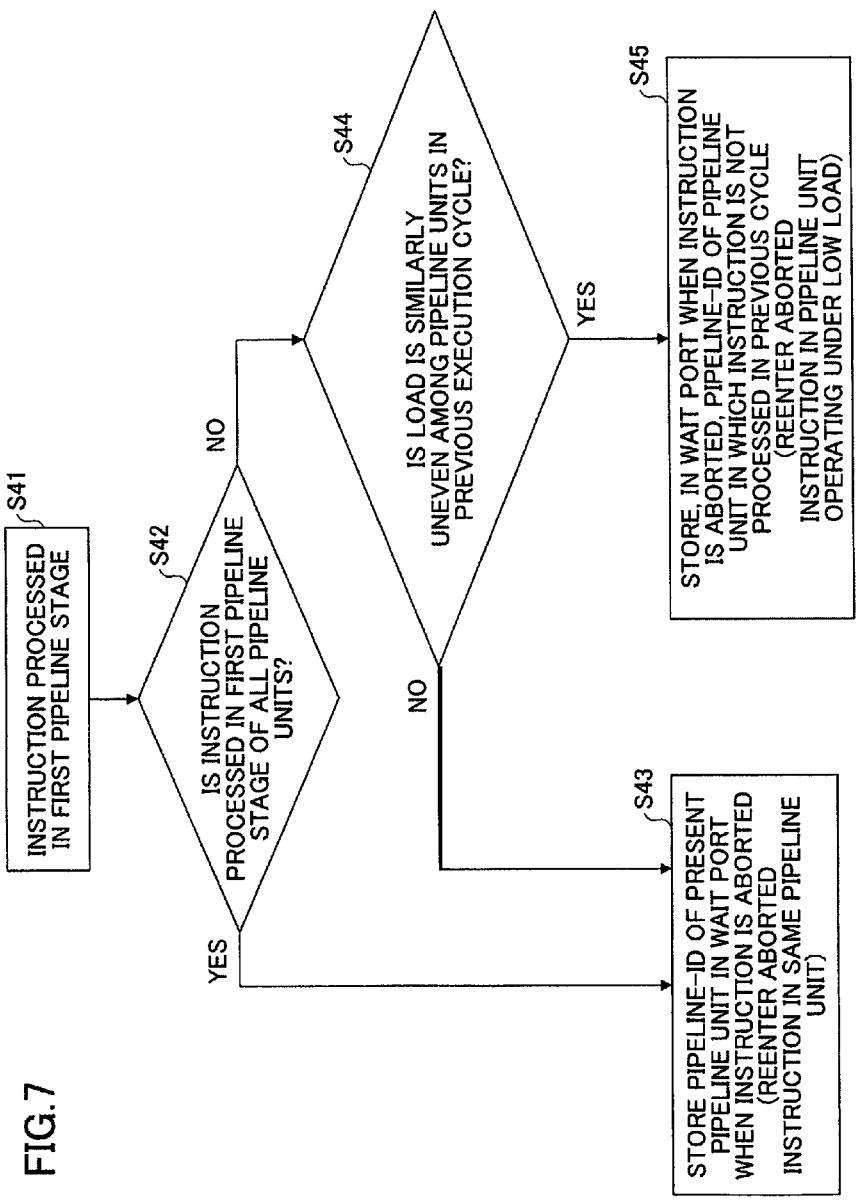
FIG. 7 is a flowchart of details of determining the pipeline unit used for reentering the instructions in the operations of FIG. 6.

FIG. 7 is a flowchart of details of the operation of determining the pipeline unit to be used for reentering the instructions, performed by the reenter pipeline determining unit 50 in step S2 of FIG. 6. In step S41, when a pipeline stage in the first stage of a particular pipeline unit is presently used, the reenter pipeline determining unit 50 determines whether a pipeline stage in the first stage of another pipeline unit is also used (step S42). Assuming that there are three or more pipeline units, it is also determined in step S42 as to whether the pipeline stages of the first stages in all of the pipeline units are presently used. When the determination result of step S42 is YES, i.e., when the other pipeline unit is also presently used, the operation proceeds to step S43. In step S43, the reenter pipeline determining unit 50 determines that the particular pipeline unit is to be the pipeline unit used for reentering the instructions. When the other pipeline unit is also used, it means that the load is not uneven among the plural pipeline units, and therefore the reenter pipeline determining unit 50 determines that it is not possible to distribute the load any further.

Meanwhile, when the determination result of step S42 is NO, the operation proceeds to step S44. In this case, there is a vacant (not used) pipeline unit, and therefore the reenter pipeline determining unit 50 determines that the load is uneven among the plural pipeline units. In step S44, the reenter pipeline determining unit 50 determines whether the load is similarly uneven among the pipeline units in the previous execution cycle. The statuses of the pipeline units in the previous execution cycle are obtained by referring to the usage statuses of the pipeline stages of the second stages in the present execution cycle. "The load is similarly uneven in the previous execution cycle" means that the pipeline units are in the following statuses in the previous execution cycle. That is, also in the previous execution cycle, the particular pipeline unit is used, and the other pipeline unit is not used. Accordingly, in this case, the particular pipeline unit is used over two continuous execution cycles, and the other pipeline unit is not used over two continuous execution cycles.

When the determination result of step S44 is NO, i.e., when the load is not similarly uneven among the pipeline units in the previous execution cycle, the operation proceeds to step S43. Meanwhile, when the determination result of step S44 is YES, i.e., when the load is similarly uneven among the pipeline units in the previous execution cycle, the operation proceeds to step S45. In step S45, with respect to the particular pipeline unit, the reenter pipeline determining unit 50 determines the pipeline unit that is not used in the present execution cycle or the previous execution cycle, as the pipeline unit used for reentering the instructions. For example, in this case, the other pipeline unit whose first and second pipeline stages are not used in the present execution cycle is determined as the pipeline unit that is not used in the present execution cycle or the previous execution cycle. This is because the other pipeline unit is not used over two continuous execution cycles, and it is therefore determined that the load is uneven between the particular pipeline unit and the other pipeline unit.

Next, a description is given of operations performed by the processor according to an embodiment of the present invention with reference to FIGS. 8 and 9. FIG. 8 illustrates an example of an operation when the load is not adjusted among plural pipeline units. FIG. 9 illustrates an example of an operation when the reenter pipeline determining unit 50 illustrated in FIG. 5 is used (i.e., when the load is adjusted) under the same conditions as those of the case of FIG. 8. However, in the example of FIG. 9, as a matter of convenience, the number of pipeline stages in each pipeline unit is four stages, instead of three stages as in the case of FIG. 5.

In FIGS. 8 and 9, a time axis (execution cycles) extends in a direction toward the right side, and new instructions 1 through 10 are indicated in a downward direction. In this example, the pipeline enter instruction selection units 11 and 12 prioritize instructions to be reentered after the abort factors are solved, over the new instructions. Only when there are no instructions to be reentered, the pipeline enter instruction selection units 11 and 12 enter new instructions into the pipeline units 21 and 22. In FIGS. 8 and 9, the first pipeline stage of the pipeline unit 21 is indicated as 0-1, the second pipeline stage of the pipeline unit 21 is indicated as 0-2, and the third pipeline stage of the pipeline unit 21 is indicated as 0-3, so forth. Similarly, the first pipeline stage of the pipeline unit 22 is indicated as 1-1, the second pipeline stage of the pipeline unit 22 is indicated as 1-2, and the third pipeline stage of the pipeline unit 22 is indicated as 1-3, so forth. Furthermore, when the same instruction as an instruction that has previously been entered is reentered, the corresponding instruction is underlined. When an instruction has been aborted due to an abort factor as a result of being executed by a pipeline unit and the aborted instruction is registered in a wait port unit, the pipeline unit used for reentering the instruction is indicated as ⇒ 0 (the pipeline unit 21 is used for reentering the instruction) or ⇒ 1 (the pipeline unit 22 is used for reentering the instruction).

In the operation examples illustrated in FIGS. 8 and 9, new instructions 1 and 2 are entered into the pipeline units 21 and 22, such that the load is distributed. However, new instructions 3 and onward are entered into the pipeline unit 21, such that the load is concentrated in the pipeline unit 21. From the eighth execution cycle onward, the abort factors are solved, and the instructions registered in the wait port unit are reentered into the pipeline units.

In the operation example of FIG. 8, the load is not adjusted between the pipeline units 21 and 22. Thus, an instruction registered in a wait port unit is reentered into the same pipeline unit as that used for entering a new instruction. Accordingly, from instruction 3 onward, new instructions are entered into the pipeline unit 21 and instructions registered in the wait port unit are reentered into the same pipeline unit 21. Consequently, during the six execution cycles (from the ninth execution cycle to the fourteenth execution cycle), the pipeline unit 21 is used for reentering instructions 3 through 8 that are reentered, and it is not possible to enter new instructions during these execution cycles. After instructions 3 through 8 are reentered, in the fifteenth and sixteenth execution cycles, new instructions 9 and 10 are entered.

Meanwhile, in the operation example illustrated in FIG. 9, the reenter pipeline determining unit 50 illustrated in FIG. 5 adjusts the load between the pipeline units 21 and 22. Specifically, the reenter pipeline determining unit 50 detects that the load is concentrated in the pipeline unit 21, and instructions 4 through 8 are reentered into the pipeline unit 22. Thus, the pipeline unit 21 is not used for reentering instructions from the tenth execution cycle onward. New instructions 9 and 10 are entered into the pipeline unit 21 in the tenth and eleventh execution cycles. As described above, in the operation example illustrated in FIG. 8, the new instructions 9 and 10 are entered into the pipeline unit 21 in the fifteenth and sixteenth execution cycles. Meanwhile, in the operation example illustrated in FIG. 9, the new instructions 9 and 10 are entered into the pipeline unit 21 five execution cycles earlier than those of the operation example illustrated in FIG. 8. This is because the reenter pipeline determining unit 50 according to an embodiment of the present invention adjusts the load between the pipeline units 21 and 22. As described above, the reenter pipeline determining unit 50 according to an embodiment of the present invention adjusts the load between the pipeline units 21 and 22, and therefore the load is efficiently distributed and the usage efficiency of the pipeline units 21 and 22 is enhanced.

Figure 10:
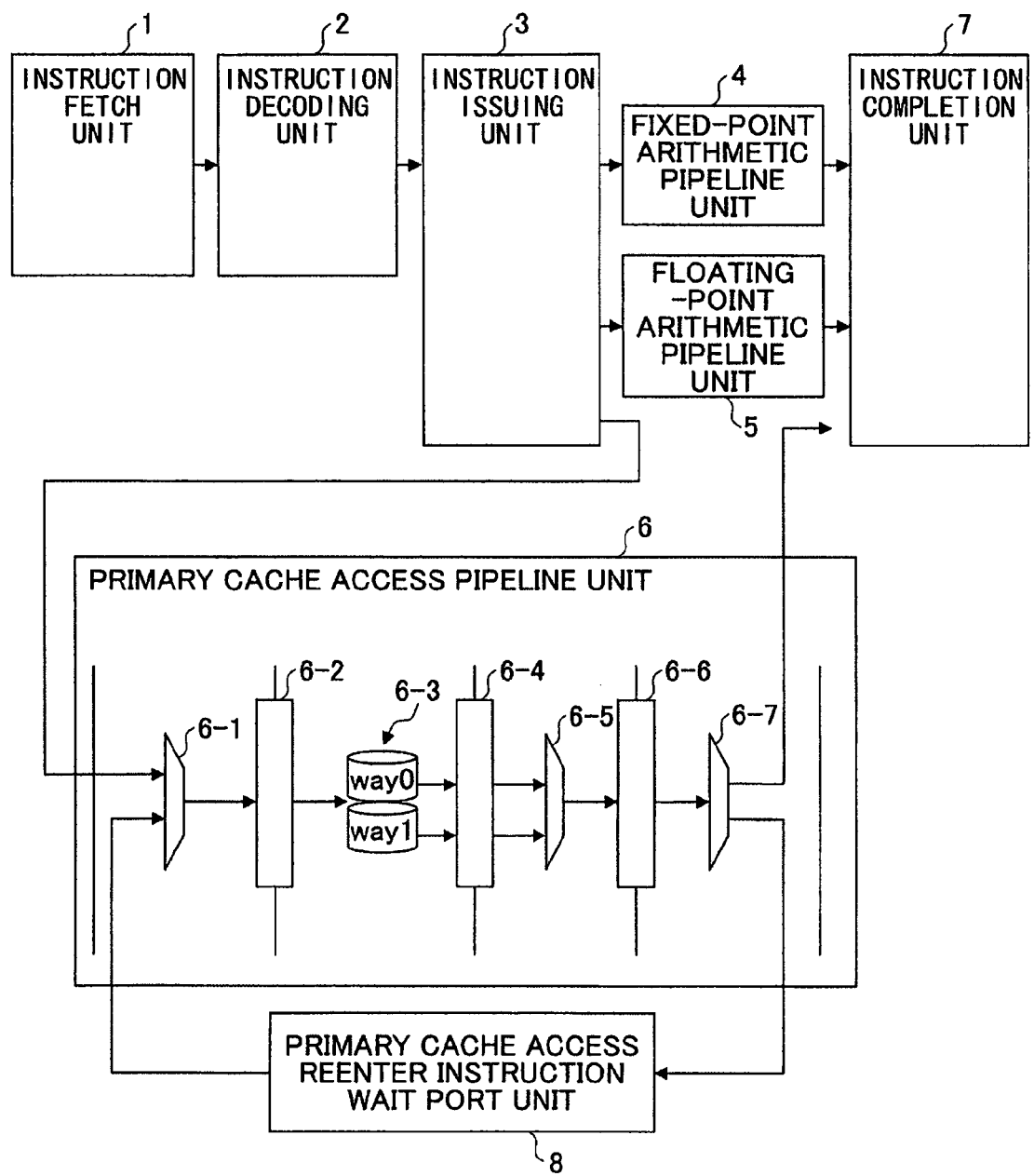
FIG. 10 is a block diagram of a processor according to a third embodiment of the present invention.

Next, a description is given of a processor according to a third embodiment of the present invention, with reference to FIG. 10. The processor according to the third embodiment includes an instruction fetch unit 1 for fetching an instruction from a memory (not illustrated), an instruction decoding unit 2 for decoding the fetched instruction, and an instruction issuing unit 3 for entering the decoded instruction into a pipeline unit. The instruction issuing unit 3 corresponds to the new instruction issue unit 10 illustrated in FIGS. 3 and 4.

The processor according to the third embodiment further includes a fixed-point arithmetic pipeline unit 4 for executing fixed-point arithmetic, a floating-point arithmetic pipeline unit 5 for executing floating-point arithmetic, and a primary cache access pipeline unit 6. The primary cache access pipeline unit 6 corresponds to the pipeline units 21 and 22 illustrated in FIGS. 3 and 4. The instruction issuing unit 3 selects the fixed-point arithmetic pipeline unit 4, the floating-point arithmetic pipeline unit 5, or the primary cache access pipeline unit 6, in accordance with the type of instruction decoded by the instruction decoding unit 2, and enters a new instruction into the selected pipeline unit. Specifically, the instruction issuing unit 3 enters a new fixed-point arithmetic instruction into the fixed-point arithmetic pipeline unit 4. The instruction issuing unit 3 enters a new floating-point arithmetic instruction into the floating-point arithmetic pipeline unit 5. The instruction issuing unit 3 enters a new memory access instruction into the primary cache access pipeline unit 6. FIG. 10 illustrates only one primary cache access pipeline unit 6 as one of the pipeline units 21 and 22, and the other pipeline unit 21 or 22 is not illustrated.

The processor according to the third embodiment further includes a primary cache access reenter instruction wait port unit 8 and an instruction completion unit 7. When the primary cache access pipeline unit 6 completes the execution of a given instruction (new memory access instruction), the primary cache access pipeline unit 6 inputs a signal indicating a memory access instruction completion report to the instruction completion unit 7. When the primary cache access pipeline unit 6 cannot return a memory access instruction completion report to the instruction completion unit 7 due to an abort factor, the primary cache access pipeline unit 6 registers the memory access instruction into the primary cache access reenter instruction wait port unit 8. The primary cache access reenter instruction wait port unit 8 corresponds to the wait port units 31 and 32 illustrated in FIG. 3 or the wait port unit 30 illustrated in FIG. 4. Although not illustrated, the processor according to the third embodiment includes function units similar to the reenter pipeline determining unit 50 and the reenter instruction selection units 41 and 42 or the reenter instruction selection units 43 and 44 according to the first or second embodiment.

The primary cache access pipeline unit 6 includes a pipeline enter instruction selection unit 6-1, a primary cache access pipeline latch (first stage) 6-2, and a tag match search/primary cache reading unit 6-3. Furthermore, the primary cache access pipeline unit 6 includes a primary cache access pipeline latch (second stage) 6-4, a cache hit data selection unit 6-5, a primary cache access pipeline latch (third stage) 6-6, and an instruction completion response/abort instruction processing unit 6-7. The pipeline enter instruction selection unit 6-1 and the primary cache access pipeline latch (first stage) 6-2 correspond to the pipeline stage 21-1 or the pipeline stage 22-1 of the first stage illustrated in FIGS. 3, 4, and 5. The tag match search/primary cache reading unit 6-3 and the primary cache access pipeline latch (second stage) 6-4 correspond to the pipeline stage 21-2 or the pipeline stage 22-2 of the second stage illustrated in FIGS. 3, 4, and 5. The cache hit data selection unit 6-5 and the primary cache access pipeline latch (third stage) 6-6 correspond to the pipeline stage 21-3 or the pipeline stage 22-3 of the third stage illustrated in FIGS. 3, 4, and 5.

The primary cache access pipeline unit 6 performs a primary cache access pipeline process (described below). As a result of the process, when the primary cache access pipeline unit 6 finds data (cache hit) for the primary cache (not illustrated) and the primary cache access pipeline unit 6 is able to return the data, the primary cache access pipeline unit 6 returns the data to the instruction completion unit 7. Accordingly, execution of the memory access instruction is completed. Meanwhile, when the primary cache access pipeline unit 6 does not find data (cache miss) for the primary cache and the primary cache access pipeline unit 6 is unable to return the data, the memory access instruction is aborted, and the aborted memory access instruction is registered into the primary cache access reenter instruction wait port unit 8.

Similar to the pipeline units 21 and 22 of the first or second embodiment, the primary cache access pipeline unit 6 of the third embodiment has a valid bit and a reenter pipeline-ID (not illustrated).

Figure 11:
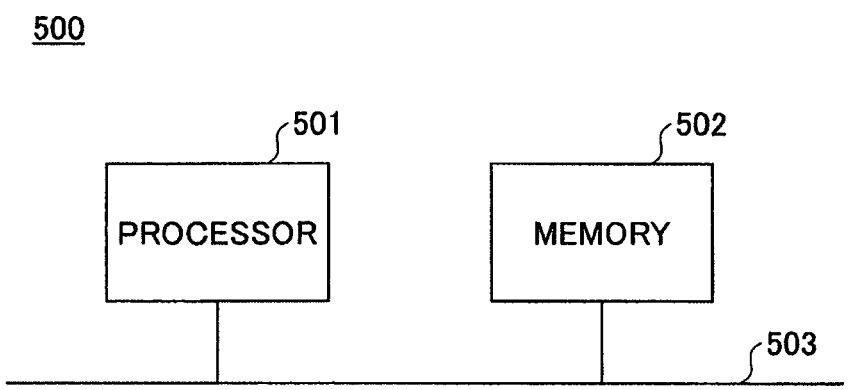
FIG. 11 is a block diagram of a computer according to a fourth embodiment of the present invention.

Next, a description is given of a computer according to a fourth embodiment of the present invention with reference to FIG. 11. A computer 500 according to the fourth embodiment illustrated in FIG. 11 is an information processor (for example, a server) including a memory 502 acting as a storage device for storing instructions, and a processor 501 acting as an arithmetic processor that is connected to the memory 502 via a bus 503. The memory 502 stores programs including instructions that are executed by the processor 501. The processor 501 may be, for example, the processor according to the first embodiment described above with reference to FIG. 3. In this case, when the processor 501 executes a program stored in the memory 502, the instruction that is written in the program is entered into the pipeline units 21 and 22 via the new instruction issue unit 10 and the pipeline enter instruction selection units 11 and 12 illustrated in FIG. 3. The operation of the processor 501 after the instruction is entered into the pipeline units 21 and 22 is the same as that described in the first embodiment.

The processor according to the second embodiment described with reference to FIG. 4 may also be applied as the processor 501. In this case, when the processor 501 executes a program stored in the memory 502, the instruction that is written in the program is entered into the pipeline units 21 and 22 via the new instruction issue unit 10 and the pipeline enter instruction selection units 11 and 12 illustrated in FIG. 3. The operation of the processor 501 after the instruction is entered into the pipeline units 21 and 22 is the same as that described in the second embodiment.

The processor according to the third embodiment described with reference to FIG. 10 may also be applied as the processor 501. In this case, when the processor 501 executes a program stored in the memory 502, the instruction that is written in the program is fetched by the instruction fetch unit 1 illustrated in FIG. 10, the fetched instruction is decoded by the instruction decoding unit 2, and the decoded instruction is entered into, for example, the primary cache access pipeline unit 6, by the instruction issuing unit 3.

According to an embodiment of the present invention, the load is efficiently distributed among plural pipeline units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processor comprising:
   a first pipeline unit configured to execute a first instruction that is input;
   a second pipeline unit configured to execute a second instruction that is input;
   a registration unit into which an aborted instruction is registered, the aborted instruction being the first instruction when the first pipeline unit is unable to complete the first instruction or the second instruction when the second pipeline unit is unable to complete the second instruction;
   a determination unit configured to make a determination as to which one of the first pipeline unit and the second pipeline unit is operating under a lower load; and
   an input unit configured to input, in the first pipeline unit or the second pipeline unit that is determined as operating under the lower load by the determination unit, the aborted instruction that is registered in the registration unit;
   wherein the first pipeline unit includes a first processing unit that executes a first process in a first execution stage and a second processing unit that executes a second process in a second execution stage succeeding the first execution stage,
   the second pipeline unit includes a third processing unit that executes a third process in a third execution stage and a fourth processing unit that executes a fourth process in a fourth execution stage succeeding the third execution stage,
   the determination unit determines that the second pipeline unit is operating under the lower load when the first processing unit and the second processing unit are both presently used and the third processing unit and the fourth processing unit are both not presently used, and
   the determination unit determines that the first pipeline unit is operating under the lower load when the third processing unit and the fourth processing unit are both presently used and the first processing unit and the second processing unit are both not presently used, wherein the first processing unit includes a first information item that indicates whether the first processing unit is presently used or not, the second processing unit includes a second information item that indicates whether the second processing unit is presently used or not, the third processing unit includes a third information item that indicates whether the third processing unit is presently used or not, the fourth processing unit includes a fourth information item that indicates whether the fourth processing unit is presently used or not, and the determination unit includes a first AND gate that receives the first information item, the second information item, information obtained by inverting the third information item, and information obtained by inverting the fourth information item, a first XOR gate that receives an output from the first AND gate and "0", and that outputs an output that is set in the second processing unit, a second AND gate that receives information obtained by inverting the first information item, information obtained by inverting the second information item, the third information item, and the fourth information item, and a second XOR gate that receives an output from the second AND gate and "1", and that outputs an output that is set in the fourth processing unit.

2. The arithmetic processor according to claim 1, wherein the determination unit determines which one of the first pipeline unit and the second pipeline unit is operating under the lower load between a time point when the first instruction is input to the first pipeline unit or the second instruction is input to the second pipeline unit and a time point when the aborted instruction is registered into the registration unit.

3. The arithmetic processor according to claim 1, wherein the registration unit includes a first registration part into which the aborted instruction is registered when the aborted instruction is to be input once again to the first pipeline unit based on the determination made by the determination unit, and a second registration part into which the aborted instruction is registered when the aborted instruction is to be input once again to the second pipeline unit based on the determination made by the determination unit, and the input unit includes a first input part that inputs, in the first pipeline unit, the aborted instruction that is registered in the first registration part, and a second input part that inputs, in the second pipeline unit, the aborted instruction that is registered in the second registration part.

4. The arithmetic processor according to claim 1, wherein the input unit includes a first input part that inputs, in the first pipeline unit, the aborted instruction that is registered in the registration unit, based on the determination made by the determination unit, and a second input part that inputs, in the second pipeline unit, the aborted instruction that is registered in the registration unit, based on the determination made by the determination unit.

5. An information processor comprising:

a storage unit configured to store instructions including a first instruction and a second instruction; and an arithmetic processor connected to the storage unit, wherein the arithmetic processor includes a first pipeline unit configured to execute the first instruction that is input;

a second pipeline unit configured to execute the second instruction that is input;

a registration unit into which an aborted instruction is registered, the aborted instruction being the first instruction when the first pipeline unit is unable to complete the first instruction or the second instruction when the second pipeline unit is unable to complete the second instruction;

a determination unit configured to make a determination as to which one of the first pipeline unit and the second pipeline unit is operating under a lower load; and an input unit configured to input, in the first pipeline unit or the second pipeline unit that is determined as operating under the lower load by the determination unit, the aborted instruction that is registered in the registration unit, wherein the first pipeline unit includes a first processing unit that executes a first process in a first execution stage and a second processing unit that executes a second process in a second execution stage succeeding the first execution stage, the second pipeline unit includes a third processing unit that executes a third process in a third execution stage and a fourth processing unit that executes a fourth process in a fourth execution stage succeeding the third execution stage, the determination unit determines that the second pipeline unit is operating under the lower load when the first processing unit and the second processing unit are both presently used and the third processing unit and the fourth processing unit are both not presently used, and the determination unit determines that the first pipeline unit is operating under the lower load when the third processing unit and the fourth processing unit are both presently used and the first processing unit and the second processing unit are both not presently used, wherein the first processing unit includes a first information item that indicates whether the first processing unit is presently used or not, the second processing unit includes a second information item that indicates whether the second processing unit is presently used or not, the third processing unit includes a third information item that indicates whether the third processing unit is presently used or not, the fourth processing unit includes a fourth information item that indicates whether the fourth processing unit is presently used or not, and the determination unit includes a first AND gate that receives the first information item, the second information item, information obtained by inverting the third information item, and information obtained by inverting the fourth information item, a first XOR gate that receives an output from the first AND gate and "0", and that outputs an output that is set in the second processing unit, a second AND gate that receives information obtained by inverting the first information item, information obtained by inverting the second information item, the third information item, and the fourth information item, and a second XOR gate that receives an output from the second AND gate and "1", and that outputs an output that is set in the fourth processing unit.

6. The information processor according to claim 5, wherein the determination unit determines which one of the first pipeline unit and the second pipeline unit is operating under the lower load between a time point when the first instruction is input to the first pipeline unit or the second instruction is input to the second pipeline unit and a time point when the aborted instruction is registered into the registration unit.

7. A pipeline control method of an arithmetic processor, the pipeline control method comprising:
 executing a first instruction that is input, the first instruction being executed by a first pipeline unit;
 executing a second instruction that is input, the second instruction being executed by a second pipeline unit;
 registering an aborted instruction, the aborted instruction being the first instruction when the first pipeline unit is unable to complete the first instruction or the second instruction when the second pipeline unit is unable to complete the second instruction;
 determining which one of the first pipeline unit and the second pipeline unit is operating under a lower load; and
 inputting, in the first pipeline unit or the second pipeline unit that is determined as operating under the lower load at the determining, the aborted instruction that is registered,
 wherein the first pipeline unit includes a first processing unit that executes a first process in a first execution stage and a second processing unit that executes a second process in a second execution stage succeeding the first execution stage,
 the second pipeline unit includes a third processing unit that executes a third process in a third execution stage and a fourth processing unit that executes a fourth process in a fourth execution stage succeeding the third execution stage,
 the determining includes determining that the second pipeline unit is operating under the lower load when the first processing unit and the second processing unit are both presently used and the third processing unit and the fourth processing unit are both not presently used, and
 the determining includes determining that the first pipeline unit is operating under the lower load when the third processing unit and the fourth processing unit are both presently used and the first processing unit and the second processing unit are both not presently used,
 wherein the first processing unit includes a first information item that indicates whether the first processing unit is presently used or not,
 the second processing unit includes a second information item that indicates whether the second processing unit is presently used or not,
 the third processing unit includes a third information item that indicates whether the third processing unit is presently used or not,
 the fourth processing unit includes a fourth information item that indicates whether the fourth processing unit is presently used or not, and
 the determining includes
  receiving, by way of a first AND gate, the first information item, the second information item, information obtained by inverting the third information item, and information obtained by inverting the fourth information item,
  receiving, by way of a first XOR gate, an output from the first AND gate and "0",
  outputting, by way of the first XOR gate, an output that is set in the second processing unit,
  receiving, by way of a second AND gate, information obtained by inverting the first information item, information obtained by inverting the second information item, the third information item, and the fourth information item, and
  receiving, by way of a second XOR gate, an output from the second AND gate and "1", and
  outputting, by way of the second XOR gate, an output that is set in the fourth processing unit.

8. The pipeline control method according to claim 7, wherein
 the determining includes determining which one of the first pipeline unit and the second pipeline unit is operating under the lower load between a time point when the first instruction is input to the first pipeline unit or the second instruction is input to the second pipeline unit and a time point when the aborted instruction is registered.

9. The arithmetic processor according to claim 1,
 wherein the first information item indicates "1" when the first processing unit is presently used and indicates "0" when the first processing unit is not presently used,
 wherein the second information item indicates "1" when the second processing unit is presently used and indicates "0" when the second processing unit is not presently used,
 wherein the third information item indicates "1" when the third processing unit is presently used and indicates "0" when the third processing unit is not presently used,
 wherein the fourth information item indicates "1" when the fourth processing unit is presently used and indicates "0" when the fourth processing unit is not presently used,
 wherein when "0" is the output from the first XOR gate or the output from the second XOR gate, the first pipeline unit is indicated, and when "1" is the output from the first XOR gate or the output from the second XOR gate, the second pipeline unit is indicated.

10. The information processor according to claim 5,
 wherein the first information item indicates "1" when the first processing unit is presently used and indicates "0" when the first processing unit is not presently used,
 wherein the second information item indicates "1" when the second processing unit is presently used and indicates "0" when the second processing unit is not presently used,
 wherein the third information item indicates "1" when the third processing unit is presently used and indicates "0" when the third processing unit is not presently used,
 wherein the fourth information item indicates "1" when the fourth processing unit is presently used and indicates "0" when the fourth processing unit is not presently used,
 wherein when "0" is the output from the first XOR gate or the output from the second XOR gate, the first pipeline unit is indicated, and when "1" is the output from the first XOR gate or the output from the second XOR gate, the second pipeline unit is indicated.

11. The pipeline control method according to claim 7,
 wherein the first information item indicates "1" when the first processing unit is presently used and indicates "0" when the first processing unit is not presently used, wherein the second information item indicates "1" when the second processing unit is presently used and indicates "0" when the second processing unit is not presently used, wherein the third information item indicates "1" when the third processing unit is presently used and indicates "0" when the third processing unit is not presently used, wherein the fourth information item indicates "1" when the fourth processing unit is presently used and indicates "0" when the fourth processing unit is not presently used, wherein when "0" is the output from the first XOR gate or the output from the second XOR gate, the first pipeline unit is indicated, and when "1" is the output from the first XOR gate or the output from the second XOR gate, the second pipeline unit is indicated.

* * * * *